(12) United States Patent
Morneau et al.

(10) Patent No.: US 9,518,392 B2
(45) Date of Patent: Dec. 13, 2016

(54) DECORATIVE PANEL AND METHOD FOR MANUFACTURING THE SAME

(71) Applicant: MAAX BATH, INC., Lachine (CA)

(72) Inventors: Hugues Morneau, St-Etienne-de-Lauzon (CA); Nicolas Cloutier, Tring Jonction (CA); Guillaume Dionne, Quebec (CA)

(73) Assignee: Maax Bath Inc., Lachine (CA)

( * ) Notice: Subject to any disclaimer, the term of this patent is extended or adjusted under 35 U.S.C. 154(b) by 0 days.

(21) Appl. No.: 14/245,621

(22) Filed: Apr. 4, 2014

(65) Prior Publication Data

US 2014/0331585 A1    Nov. 13, 2014

Related U.S. Application Data

(63) Continuation of application No. PCT/CA2012/000929, filed on Oct. 5, 2012.
(Continued)

(51) Int. Cl.
*E04F 13/00* (2006.01)
*B29C 70/30* (2006.01)

(52) U.S. Cl.
CPC ............. *E04F 13/00* (2013.01); *B29C 70/305* (2013.01); *Y10T 156/1002* (2015.01)

(58) Field of Classification Search
CPC ............... B44F 9/04; B44F 11/06; B44F 7/00; B44F 11/04; B32B 2471/00; B32B 2255/26; B32B 2255/28; B32B 2250/24; B32B 2451/00; B32B 7/00; B44C 1/20; E04F 15/10; E04F 13/18; E04F 15/02; E04F 13/00; B29C 70/305; Y10T 156/1002

See application file for complete search history.

(56) References Cited

U.S. PATENT DOCUMENTS 3,177,279 A * 4/1965 Bilodeau ................. B28B 7/007
                                                        249/112
3,519,527 A * 7/1970 Crowley ................. B32B 27/00
                                                         156/79

(Continued)

FOREIGN PATENT DOCUMENTS

| CA | 1243925 | 11/1988 |
|---|---|---|
| CN | 2497994 | 7/2002 |

(Continued)

OTHER PUBLICATIONS

International Search Report and Written Opinion mailed Jan. 14, 2013, in corresponding PCT Application No. PCT/CA2012/000929.

(Continued)

*Primary Examiner* — James Ference
(74) *Attorney, Agent, or Firm* — Mintz Levin Cohn Ferris Glovsky and Popeo, P.C.; Steven M. Jensen

(57) ABSTRACT

There is provided a decorative panel comprising: a backing layer having a back face for abutting a panel-receiving surface and a front face opposite to the back face; a relief decorative layer attached to the front face of the backing layer and comprising: a layer of a base polymer attached to the front face of the backing layer and substantially covering the front face of the backing layer; and a relief element made of a layer of an overlay polymer attached to the layer of base polymer and covering a portion thereof.

19 Claims, 22 Drawing Sheets

Related U.S. Application Data

(60) Provisional application No. 61/543,573, filed on Oct. 5, 2011.

(56) References Cited

U.S. PATENT DOCUMENTS

| | | | | |
|---|---|---|---|---|
| 3,660,187 | A * | 5/1972 | Shortway | C08J 9/101 156/277 |
| 3,772,138 | A * | 11/1973 | Witman | 428/159 |
| 3,811,915 | A * | 5/1974 | Burrell et al. | 428/143 |
| 4,097,635 | A | 6/1978 | Sanz Hernandez et al. | |
| 4,126,727 | A * | 11/1978 | Kaminski | B32B 5/20 101/32 |
| 4,169,907 | A | 10/1979 | Barker et al. | |
| 4,187,131 | A * | 2/1980 | Shortway et al. | 156/79 |
| 4,214,028 | A * | 7/1980 | Shortway et al. | 428/159 |
| 4,217,385 | A * | 8/1980 | Shortway et al. | 428/159 |
| 4,233,343 | A * | 11/1980 | Barker | B05D 5/06 427/257 |
| 4,248,922 | A * | 2/1981 | Shortway et al. | 428/159 |
| 4,267,221 | A * | 5/1981 | Ishikawa | E04C 2/30 428/121 |
| 4,298,646 | A * | 11/1981 | Haemer | B32B 5/20 427/180 |
| 4,329,822 | A * | 5/1982 | Russell | 52/309.16 |
| 4,349,588 | A * | 9/1982 | Schiffer | B44F 9/04 427/230 |
| 4,446,177 | A | 5/1984 | Munoz et al. | |
| 4,491,616 | A * | 1/1985 | Schmidle | D06N 7/0028 427/272 |
| 4,500,373 | A | 2/1985 | Kubota | |
| 4,504,523 | A * | 3/1985 | Miller, Jr. | D06N 7/0052 427/180 |
| 4,579,767 | A | 4/1986 | Coggan et al. | |
| 4,581,255 | A * | 4/1986 | Coggan et al. | 427/264 |
| 4,617,222 | A * | 10/1986 | Courtoy | B44C 1/205 427/510 |
| 4,789,604 | A * | 12/1988 | van der Hoeven | B44C 5/0476 428/503 |
| RE33,599 | E * | 5/1991 | Courtoy | D06N 7/0013 427/264 |
| 5,052,160 | A | 10/1991 | Gentsch et al. | |
| 5,219,787 | A * | 6/1993 | Carey | H01L 21/31144 257/E21.257 |
| 5,328,730 | A * | 7/1994 | Lowe | B28B 11/00 156/61 |
| 5,627,231 | A * | 5/1997 | Shalov | B05D 1/28 524/284 |
| 5,634,307 | A * | 6/1997 | Larriberot et al. | 52/314 |
| 5,645,889 | A * | 7/1997 | Potosky | B05D 5/061 427/256 |
| 5,830,937 | A * | 11/1998 | Shalov | B29C 70/603 428/502 |
| 5,858,160 | A * | 1/1999 | Piacente | B44C 1/205 156/277 |
| 5,866,225 | A | 2/1999 | Crossley | |
| 5,919,554 | A * | 7/1999 | Watterson et al. | 428/201 |
| 6,106,952 | A * | 8/2000 | Yamashita et al. | 428/425.8 |
| 6,146,711 | A * | 11/2000 | Courtoy | C09D 4/00 156/244.17 |
| 6,150,009 | A | 11/2000 | Stecker | |
| 6,835,420 | B1 * | 12/2004 | Rockrath et al. | 427/407.1 |
| 7,025,013 | B1 * | 4/2006 | Staerzl | C23D 13/00 114/222 |
| 7,131,380 | B2 * | 11/2006 | Huffer | 101/491 |
| 8,501,069 | B1 * | 8/2013 | Williamson | B29C 37/0032 264/259 |
| 2001/0002293 | A1 | 5/2001 | Eby et al. | |
| 2001/0055662 | A1 | 12/2001 | Fusco | |
| 2002/0146954 | A1 * | 10/2002 | Drees et al. | 442/290 |
| 2002/0160680 | A1 * | 10/2002 | Laurence et al. | 442/394 |
| 2003/0003827 | A1 * | 1/2003 | Mikats | B29C 47/0047 442/59 |
| 2003/0113520 | A1 | 6/2003 | Takahashi et al. | |
| 2003/0138617 | A1 | 7/2003 | Courtoy et al. | |
| 2003/0180509 | A1 | 9/2003 | Wright et al. | |
| 2004/0170873 | A1 * | 9/2004 | Smith | 428/703 |
| 2004/0219339 | A1 | 11/2004 | Dempsey et al. | |
| 2005/0055931 | A1 * | 3/2005 | Rochette | 52/506.01 |
| 2006/0000173 | A1 * | 1/2006 | Edstrom | 52/313 |
| 2006/0068213 | A1 * | 3/2006 | O'Brien et al. | 428/524 |
| 2006/0136083 | A1 | 6/2006 | Hansson et al. | |
| 2007/0187864 | A1 | 8/2007 | Mincey et al. | |
| 2007/0202305 | A1 | 8/2007 | Sun | |
| 2007/0218252 | A1 * | 9/2007 | Donald | B29C 39/006 428/143 |
| 2008/0115437 | A1 | 5/2008 | Bordener | |
| 2008/0311346 | A1 | 12/2008 | Ohno | |
| 2009/0035473 | A1 * | 2/2009 | Jaworowski | C09D 5/08 427/384 |
| 2009/0061184 | A1 * | 3/2009 | Jaworowski | C23C 18/10 428/212 |
| 2009/0068418 | A1 | 3/2009 | Iwase et al. | |
| 2010/0151225 | A1 * | 6/2010 | Mabey | 428/304.4 |
| 2011/0223389 | A1 | 9/2011 | Lin et al. | |

FOREIGN PATENT DOCUMENTS

| | | |
|---|---|---|
| EP | 2175082 A1 | 4/2010 |
| FR | 1471270 | 3/1967 |
| GB | 1388536 | 3/1975 |
| GB | 2428406 A | 1/2007 |
| WO | 2009/124434 | 10/2009 |

OTHER PUBLICATIONS

International Preliminary Report on Patentability dated Jan. 29, 2014, in corresponding PCT Application No. PCT/CA2012/000929.
"Tile-Look FRP," <www.frpdesignsolutions.com>, Crane Composites, Inc., 2011.

* cited by examiner

DECORATIVE PANEL AND METHOD FOR MANUFACTURING THE SAME

CROSS-REFERENCE TO RELATED APPLICATIONS

This application is a continuation of PCT Patent Application No. PCT/CA2012/000929, filed Oct. 5, 2012, which claims the benefit of and priority to U.S. Provisional Patent Application Ser. No. 61/543,573, filed Oct. 5, 2011. The contents of each of the foregoing applications are incorporated herein by reference in their entirety.

TECHNICAL FIELD

The invention relates to decorative panels, and more specifically to decorative panels with a pattern and to methods for manufacturing the same.

BACKGROUND

Tiles are widely known and used in bathroom applications, to cover floors, walls or even shower walls. Tiles are usually secured on a surface using glue and cement and grout is used to fill up space between the tiles. In most instances, grout lines are visible between the tiles after the tiles have been installed.

Installing tiles may be relatively expensive, labor intensive and/or time consuming. Accordingly, decorative panels are sometimes provided as an alternative. This type of panels typically comprises a face which lies against the wall of a structure and an opposite decorative face in which a plurality of grooves or recesses are defined to simulate grout lines or other indented patterns or textures.

Different alternatives have been proposed to manufacture indented decorative panels. For instance, US Patent Application No. 2008/0115437 to Bordener discloses an indented panel manufactured using a base panel made of plastic resin in which are created a plurality of indented grid lines using a cutting tool such as a router. U.S. Pat. No. 5,052,160 to Gentsch et al. discloses a similar panel, except that the indented lines are created in the plastic resin using a tubular heater instead of a cutting tool. U.S. Pat. No. 4,169,907 to Barker et al. discloses a panel comprising a hardboard substrate on which a pattern is drawn using ink. A liquid top coat is then applied over the ink and the hardboard substrate. The ink repels the liquid top coat to form "valleys" on the panel. Since the liquid top coat is thinner over the portions of the substrate which are covered in ink, the ink is visible through the top coat.

The manufacturing of most of these panels is relatively expensive, relatively complicated, relatively labor intensive and/or relatively time consuming.

There is therefore a need for an indented decorative panel and for a method for manufacturing such as panel which is relatively inexpensive, relatively easy and relatively fast.

Features of the invention will be apparent from review of the disclosure, drawings and description of the invention below.

SUMMARY

In accordance with a first broad aspect, there is provided a decorative panel comprising: a backing layer having a back face for abutting a panel-receiving surface and a front face opposite to the back face; a relief decorative layer attached to the front face of the backing layer and comprising: a layer of a base polymer attached to the front face of the backing layer and substantially covering the front face of the backing layer; and a relief element made of a layer of an overlay polymer attached to the layer of base polymer and covering a portion thereof.

In one embodiment, the overlay polymer and the base polymer are polymerized together to define an integral structure.

In one embodiment, the overlay polymer and the base polymer have different colors.

In one embodiment, the overlay polymer and the base polymer are resin gelcoat polymers.

In one embodiment, the overlay polymer comprises styrene monomer and unsaturated polyester.

In the same or another embodiment, the base polymer comprises unsaturated polyester.

In one embodiment, the base polymer further comprises a catalyst compound.

In one embodiment, the catalyst compound comprises benzoyl peroxide.

In another embodiment, the overlay polymer and the base polymer are selected from the group consisting of: paint and urethane.

In one embodiment, the relief element is indented towards the backing layer.

In one embodiment, the relief element is received in a recess defined in the front face of the backing layer configured to accommodate the relief element and a portion of the layer of the base polymer.

In one embodiment, the relief element projects away from the backing layer.

In another embodiment, the backing layer comprises a ridge defined in the front face, the ridge being configured to accommodate thereon the relief element and a portion of the layer of the base polymer sandwiched between the relief element and the backing layer.

In one embodiment, the relief element defines a grid pattern.

In one embodiment, the decorative panel further comprises a barrier layer covering the relief decorative layer.

In one embodiment, the barrier layer is made of a transparent polymer.

In one embodiment, the decorative panel is one of a faux-tile panel and a faux-stone panel.

In one embodiment, the panel-receiving surface is one of a wall, a floor, and a ceiling.

In one embodiment, the panel-receiving surface is one of a wall of a bathroom and a floor of a bathroom.

In another embodiment, the panel-receiving surface is one of a wall of a shower enclosure and a floor of a shower enclosure.

In one embodiment, the wall is a kitchen wall.

In accordance with a second broad aspect, there is provided a method for manufacturing a decorative panel, the method comprising: providing a panel mold comprising a base panel having a 3D front surface, the 3D front surface comprising relief structures each defining a receiving surface; applying a layer of overlay polymer on the receiving surfaces of the relief structures while leaving the other portions of the 3D front surface uncovered; applying a layer of base polymer on the layer of overlay polymer and the uncovered portions of the 3D front surface; drying the layer of overlay polymer and the layer of base polymer to polymerize the layer of overlay polymer and the layer of base polymer together, thereby forming an integral decorative layer; applying a backing layer on the layer of base polymer to thereby form the decorative panel; and removing the decorative panel from the panel mold.

In one embodiment, the step of providing the panel mold comprises providing the panel mold having the base panel and a plurality of ridges projecting away from the base panel and each defining a top surface located away from the base panel, the plurality of ridges defining a plurality of recesses therebetween, each recess having an interior surface In one embodiment, the top surfaces of the ridges comprise at least two surface portions disposed in a common plane, and wherein applying the layer of overlay polymer further comprises applying the layer of overlay polymer on the at least two surface portions simultaneously.

In one embodiment, the step of applying the layer of overlay polymer further comprises: positioning a polymer applicator containing the overlay polymer adjacent the at least two surface portions; and transferring the overlay polymer from the polymer applicator onto the at least two surface portions simultaneously.

In one embodiment, the step of applying the layer of overlay polymer comprises using a paint roller covered in the overlay polymer.

In one embodiment, the method comprises placing the paint roller in contact with the at least two surface portions of the ridges simultaneously; and rolling the paint roller over the at least two surface portions to thereby cover the at least two surface portions with the overlay polymer In one embodiment, the method further comprises, before the application of the layer of overlay polymer, positioning mask plates each in a respective one of the recesses, each one of the mask plates being a mirror image of the respective one of the recesses to substantially fill the respective one of the recesses, and removing the mask plates after the application of the layer of overlay polymer.

In one embodiment, the step of applying the layer of overlay polymer comprises spraying the overlay polymer on the top surface of the ridges, the mask plates substantially preventing the overlay polymer from leaking in the recesses.

In one embodiment, the step of providing the panel mold comprises providing the panel mold having the base panel having a plurality of recesses each defining an interior surface, the plurality of recesses defining a plurality of ridges therebetween, each ridge having a top surface.

In one embodiment, the step of applying the layer of overlay polymer comprises applying the overlay polymer on the interior surface of the recesses.

In one embodiment, the step of applying the layer of base polymer comprises applying the base polymer on the top surface of the ridges.

In one embodiment, the overlay polymer and the base polymer have different colors.

In one embodiment, the method further comprises, after applying the backing layer on the base polymer, curing the backing layer.

In one embodiment, the method further comprises, before curing the backing layer, leveling the backing layer to remove air bubbles therefrom.

In one embodiment, the step of the leveling is performed using a roller.

In one embodiment, the method further comprises, before applying the layer of overlay polymer, applying a barrier coating on the receiving surface of the base panel, In one embodiment, the overlay polymer is selected from the group consisting of: polyester resin gelcoat, paint and urethane.

In one embodiment, the base polymer is selected from the group consisting of: polyester resin gelcoat, paint and urethane.

In one embodiment, the backing layer comprises a mixture of fiberglass and thermosetting resin.

In one embodiment, the thermosetting resin is selected from the group consisting of: polyester, vinylester, epoxy and urethane.

In accordance with another broad aspect, there is provided a decorative panel manufactured according to the above-described method.

In one embodiment, the decorative panel is one of a faux-tile panel and a faux-stone panel.

In one embodiment, the panel-receiving surface is one of a wall, a floor, and a ceiling.

In one embodiment, the panel-receiving surface is one of a wall of a bathroom and a floor of a bathroom.

In one embodiment, the panel-receiving surface is one of a wall of a shower enclosure and a floor of a shower enclosure.

In one embodiment, the wall is a kitchen wall.

In accordance with a further broad aspect, there is provided a panel mold for manufacturing a decorative panel, the panel mold comprising: a base panel having a first face and an opposed second face; a plurality of ridges projecting from the first face, the ridges being disposed so as to define a desired indented pattern in the decorative panel to be manufactured, each one of the ridges having a top surface located away from the base panel, at least two top surfaces of the ridges being disposed along a first plane to allow the at least two top surfaces to be simultaneously contacted by a polymer applicator.

In one embodiment, at least one other top surfaces of the ridges is disposed along a second plane.

In accordance with still another broad aspect, there is provided a kit of decorative panels for a shower, the kit comprising: a shower base; and at least one decorative panel mountable to the shower base, the at least one decorative panel comprising: a backing layer having a back face for abutting a pane-receiving surface and a front face opposite to the back face; a relief decorative layer attached to the front face of the backing layer and comprising: a layer of a base polymer substantially attached to the front face of the backing layer and covering the front face of the backing layer; and a relief element made of a layer of an overlay polymer attached to the layer of base polymer and covering a portion thereof.

In one embodiment, the layer of overlay polymer and the layer of base polymer are polymerized together to define an integral structure.

In one embodiment, the kit further comprises at least one fastener for connecting the at least one decorative panel to the shower base.

In one embodiment, the at least one fastener comprises a clip.

In one embodiment, the shower base comprises a floor, a perimeter wall surrounding the floor and a mounting flange extending upwardly from the perimeter wall, the clip being configured for engaging the mounting flange.

In one embodiment, the mounting flange comprises at least one receiving portion for receiving the clip, the at least one receiving portion being indented towards the floor to prevent the clip from extending beyond the perimeter wall.

In one embodiment, the kit further comprises a recessed storage panel mountable to the shower base adjacent the at least one decorative panel.

In one embodiment, the at least one decorative panel comprises a first decorative panel and a second decorative panel.

In one embodiment, the kit further comprises a recessed storage panel mountable to the shower base between the first and second decorative panels.

In one embodiment, the first and second decorative panels are mountable perpendicular to each other.

In accordance with still a further embodiment, there is provided a decorative panel comprising: a backing layer having a back face for abutting a panel-receiving surface and a front face opposite to the back face; a layer of base polymer having a front face and a back face attached to the front face of the backing layer, the layer of base polymer substantially covering the backing layer; and a layer of overlay polymer having a front face and a back face attached to the front face of the layer of base polymer, the layer of overlay polymer covering a first portion of the layer of base polymer, the front face of the layer of overlay polymer and a second portion of the layer of base polymer being uncovered by the layer of overlay polymer defining a 3D front surface for the decorative panel, the 3D front surface comprising relief structures.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
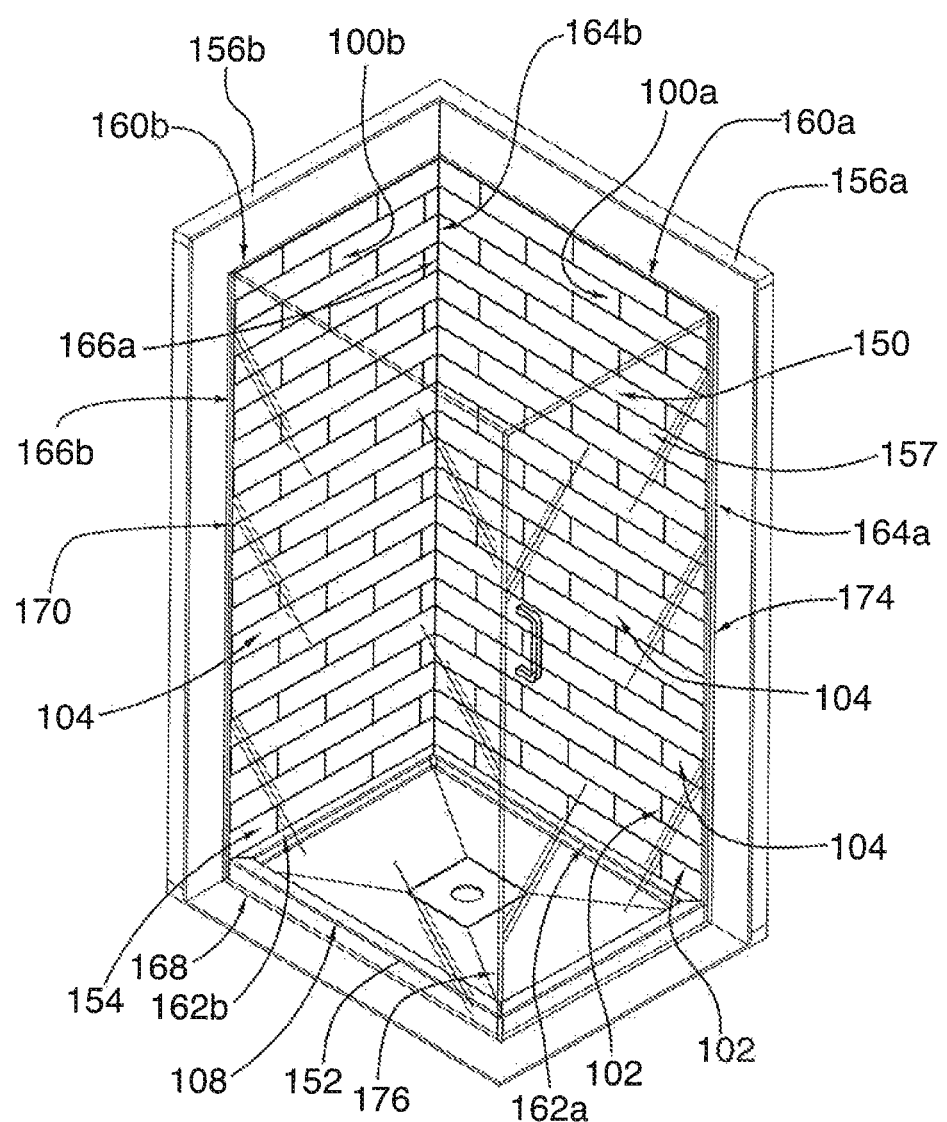
FIG. 1 is a perspective view of two decorative panels installed on walls of a shower, in accordance with one embodiment.
Figure 2:
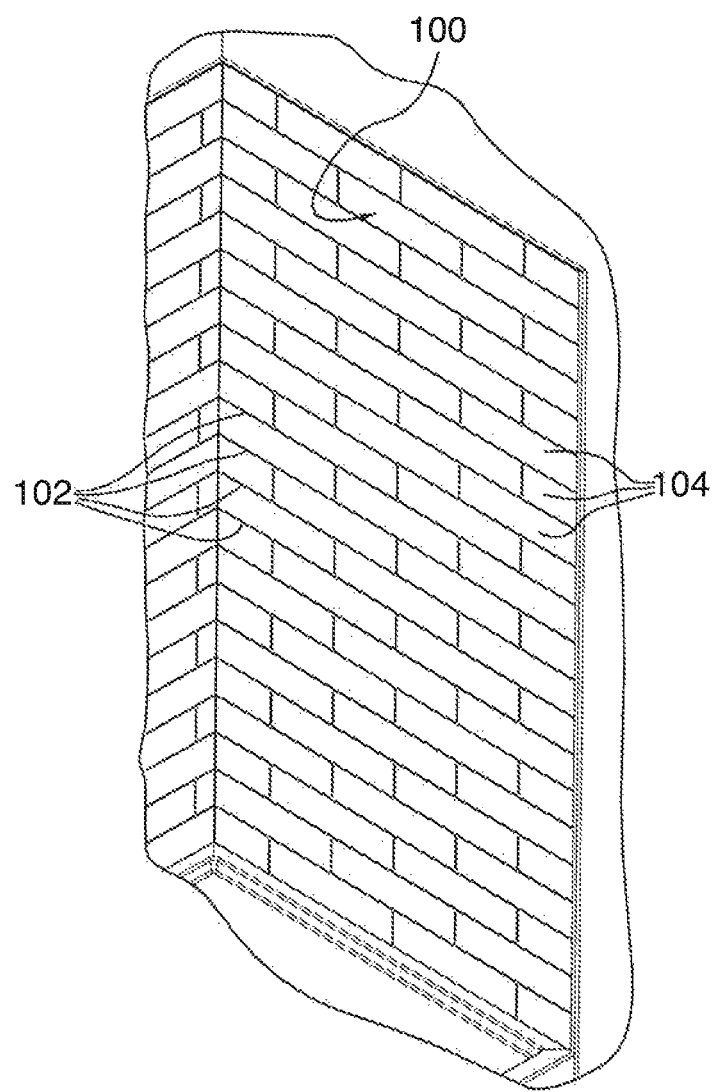
FIG. 2 is an enlarged view of one of the two decorative panels shown in FIG. 1.

Referring to FIGS. 1 and 2, there is shown a shower stall 150. The shower stall comprises a generally rectangular base 152 and two decorative panels 100a, 100b extending vertically from the base 152 and attached to one another at a generally right angle. Each panel 100a, 100b is sized and shaped to cover a corresponding shower wall 156a, 156b. In the embodiment shown in FIGS. 1 and 2, each panel 100a, 100b has a rectangular shape and comprises a top edge 160a, 160b, a bottom edge 162a, 162b and two parallel side edges 164a, 164b and 166a, 166b extending therebetween. The bottom edges 162a, 162b of the panels 100a, 100b are fixed to the base, as it will be described in greater details below. The side edge 166a of panel 100a is attached to the side edge 164b of the panel 100b, as it will be described in greater details below.

In the embodiment shown in FIG. 1, the shower stall also comprises a glass wall 154 mounted by a bottom edge 168 to the rectangular base 152. The glass wall 154 comprises a first side edge 170 affixed to the side edge 166b of panel 100b, and a second, opposed end 172. As it is apparent from FIG. 1, the glass wall 154 collaborates with walls 100*a*, 100*b* to define a shower enclosure.

To avoid water leakage during use of the shower, a hinged door 157 is also provided. The hinged door 157 comprises a first side edge 174 mounted to the side edge 164*a* of panel 100*a*. The hinged door 156 also comprises a second side edge 176, which is located adjacent to the side edge 172 of the glass wall 154 when the hinged door is closed. While in the embodiment illustrated in FIG. 1, the shower stall 150 is provided with a hinged door, the person skilled in the art will appreciate that this feature is optional and could be replaced by, for instance, a shower curtain.

In accordance with one embodiment, the decorative panels 100*a* and 100*b* are "faux-tile" panels. Since decorative panels 100*a*, 100*b* are similar, only panel 100*a* will be described. The person skilled in the art will appreciate that a similar description also applies to wall 100*b*, with proper modifications. Accordingly, the decorative panel 100*a* comprises a plurality of tile sections 104 separated by imitations of grout lines 102, which give the overall appearance of a tile wall to the panel 100. As illustrated in FIG. 2, the grout lines 102 intersect at generally straight angles to form an indented grid pattern on the decorative panel 100, which divides the decorative layer 302 of the decorative panel 100 into a plurality of generally rectangular tile portions 104.

Figure 3:
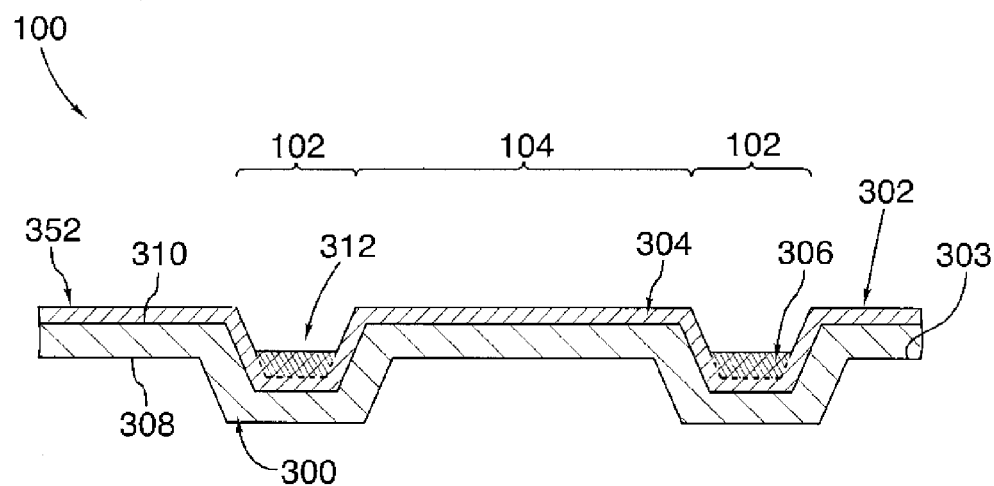
FIG. 3 is an enlarged cross-section view of the decorative panel shown in FIG. 2.

The panel 100 is a composite panel made of several layers. With reference to FIG. 3, which is a schematic representation of a cross-section of the panel (not to scale), the panel 100*a* comprises a backing layer 300 which provides substantial rigidity and structural strength to the decorative panel 100, and a decorative layer 302 affixed to the backing layer 300. More specifically, the backing layer 300 comprises a back face 308 which abuts a structure such as a wall, a floor, or a ceiling (in this case the shower wall 156*a*) when the panel 100 is installed, and a front face 310 adapted to receive the decorative layer 302 thereon.

Defined in the front face 310 of the backing layer 300 is a relief element 312. In this specific embodiment, the relief element 312 takes the form of a grid pattern, which generally corresponds to the grout lines 102 of the panel 100. In the illustrated embodiment, the relief element 312 is indented towards the backing layer 300 and creates protrusions extending from the back face 308 of the backing layer. The person skilled in the art will appreciate that these protrusions will contact the shower wall 156*a* when the panel 100 is installed. In an alternative embodiment, the spaces defined between the protrusions can be filled such that the back face 308 will be generally flat instead of having an irregular surface, therefore improving contact between the panel 100*a* and the shower wall 156*a*.

Attached to the front face 310 of the backing layer 300 is the decorative layer 302. The decorative layer 302 comprises a base polymers layer 304 and an overlay polymer layer 306, which are integrally formed to define a unitary structure and to provide the overall appearance of a tile wall. The decorative layer 302 comprises a back face 303 defined by the base polymer layer 304, the back face 303 of the decorative layer 302 being in contact with the front face 310 of the backing layer 300. The decorative layer 302 also comprises a front face 352 defined partially by the base polymer layer 304 and the overly polymer layer 306.

More specifically, the base polymer layer covers 304 substantially the whole front face 310 of the backing layer 300, including the recesses or relief elements 312, thereby forming a layer that conforms to the 3D shape of the front surface 310 of the backing layer 300. Contrary to the base polymer layer 304, the overlay polymer layer 306 is only found in grooves defined by the relief elements 312, over the base polymer layer 304. Therefore, the overlay polymer layer 306 is distributed in a grid pattern corresponding to the pattern of the relief element 312, thereby defining the grout lines 102 of the panel 100.

As it will be appreciated by a person skilled in the art, the front face 352 of the decorative layer 302 therefore define a 3D surface comprising the front face portions of the overlay polymer layer 306 and the front face of the portions of the base polymer layer 304 that are not covered by the overlay polymer layer 306. Accordingly, the 3D front face 352 of the decorative layer 302 comprises raised portions or plateaus generally corresponding to the tile sections 104 and recessed portions or valleys corresponding to grout lines 102. Accordingly, the layer of base polymer 304 is visible between the grout lines 102, on the tile portions 104 of the decorative panel 100, while the overlay polymer layer 306 is visible on the groove segments 102 when looking at the front face 352 of the decorative panel 100. Therefore, in this configuration, the base polymer 304 simulates the tiles of the panel 100 while the overlay polymer 306 provides the look of the grout lines between the tiles.

In a preferred embodiment, the base polymer 304 and the overlay polymer 306 have different colors to highlight the grout lines 102 on the decorative panel 100. To simulate a standard tile-covered surface for instance, the base polymer 304 may be manufactured using a first material colored to simulate tiles such as ceramic tiles, while the overlay polymer 306 may be manufactured using a second material colored to simulate a grout of a different color.

While in the embodiment illustrated in FIG. 3 the front face of base polymer 304 on the tile sections 104 is substantially planar, the person skilled in the art would understand that other configurations are possible. For example, the front face of base polymer 304 located on the tile sections 104 may have an irregular or 3D surface which simulates a textured tile, a stone, or the like. Moreover, to further simulate a standard tile-covered surface, the base polymer of the layer 304 may have a texture substantially similar to ceramic or the like, while the overlay polymer of the layer 306 may have a texture substantially similar to grout.

Similarly, while the grout lines 102 illustrated in FIG. 3 have a cross-sectional trapezoidal shape, it should be understood that other configurations are possible. For example, the cross-sectional shape of the grout lines 102 may be square, rectangular, rounded, or the like. While they are substantially identical, it should also be understood that the grout lines 102 may comprise a first group of grooves having first characteristics such as a same first cross-sectional shape and/or same first dimensions, and a second group of grooves having second and different characteristics such as a same second cross-sectional shape and/or same second dimensions.

While in the above embodiment, the relief element 312 is indented towards the backing layer 300 to define recesses, the relief element 312 may alternatively protrude from the backing layer 300, toward the front face, to define raised portions. In this alternative embodiment, the raised portions may be formed by the layer of overlay polymer 306 or by a combination of the layer of overlay polymer 306 and part of the layer of the base polymer 304 to define a 3D surface. In this case, the front face of the decorative layer would comprise raised portions or plateaus defined by the front face of the layer of overlay polymer 306 and indentations or valleys formed by the front face of the of base polymer layer 304 that are not covered by the overlay polymer layer 306. The 3D surface may even be formed by the overlay polymer 306 and part of the layer of the base polymer 304 covering a projection defined on the front face 310 of the backing layer 300.

In one embodiment, the base polymer 304 and the overlay polymer 306 comprise polyester resin gelcoats. Alternatively, the base polymer 304 and the overlay polymer 306 may instead comprise paint, urethane or any other coating material deemed suitable by the skilled addressee.

In one embodiment, the layer of overlay polymer 306 is made of a gelcoat comprising a mixture of styrene monomer and unsaturated polyester. In this embodiment, the layer of base polymer 304 is preferably made of catalyzed gelcoat comprising unsaturated polyester with about 5% per weight benzoyl peroxide catalyst. In the same embodiments or another embodiment, the backing layer 300 is made of a material comprising 12.5% fiberglass and 87.5% resin/filler mixture. The resin/filler mixture may comprise 44% resin and 56% filler. The resin may be made of mixture of 98.8% polymer, 1% catalyst, and 0.2% pigment. For example, filler such as calcium sulfate, catalyst such as Luperox™ DDM-9, and fiberglass such as 2400 TEX fiberglass may be used for making the backing layer 300.

In one embodiment, the layer of overlay polymer 306 has a thickness comprised between about 0.127 mm (0.005 inches) and about 0.203 mm (0.008 inches), and preferably equal to about 0.152 mm (0.006 inches). In the same or another embodiment, the layer of base polymer 304 has a thickness comprised between about 0.483 mm (0.019 inches) and about 0.610 mm (0.024 inches), and preferably equal to about 0.508 mm (0.020 inches).

In the same or another embodiment, the backing layer 300 has a thickness comprised between about 1 mm and about 3 mm, and preferably equal to about 2 mm.

In one embodiment, the base polymer layer 304 and the overlay polymer layer 306 are made from substantially identical polymers. In another embodiment, the base polymer layer 304 and the overlay polymer layer 306 are made from different polymers and/or have different characteristics such as different chemical composition, different colors, and/or the like, while being polymerizable together.

While in the present description the base polymer layer 304 is made of a single polymer, it should be understood that the base polymer layer may be made of at least two polymers having different characteristics such as different colors and being adapted to be polymerized together to form an integral layer structure. For example, adjacent tile portions 104 of the layer of base polymer 304 may be made of different polymers having a different color and polymerizable together to form an integral layer structure so that the decorative panel 100 simulates tiles of different colors. Similarly, the overlay polymer layer 306 may be made of at least two polymers having different characteristics such as different colors, for instance to simulare grout lines of 102 of different colors.

While the backing layer 300 and the layer of base polymer 304 illustrated in FIG. 3 each have substantially a constant thickness there across, it should be understood that other configurations are possible. For example, the tile sections 104 of the backing layer 300 may be thicker than the grout lines 102 of the backing layer 300 so that the back face 308 of the backing layer 300 be substantially planar. In the same or another example, the tile sections 104 of the layer of base polymer 304 may be thicker than the groove sections 102 of the layer of base polymer 304 so that the back face of the layer of base polymer 304 be substantially planar. In this case, the front face 310 of the backing layer 300 is also substantially planar.

In one embodiment, the decorative layer 302 is covered by a barrier coating (not shown). This type of coating is widely known in the art and advantageously protects the overlay polymer layer 306 and the base polymer layer 304 from wear and tear. The barrier coating is preferably made of a transparent polymer to allow the layer of overlay polymer 306 and the layer of base polymer 304 to be seen through the barrier coating, and may be shiny to further simulate the look of ceramic tiles. In an alternative embodiment, the decorative panel 100 does not comprise a barrier coating.

Having described various configurations of decorative panels, a method for manufacturing the same will now be described, with references to FIGS. 4 to 13.

Figure 4:
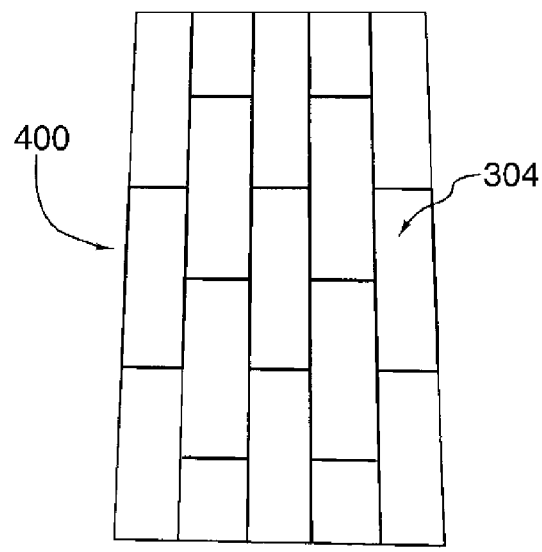
FIG. 4(7) is a schematic representation showing a panel mold, in accordance with an embodiment.

In accordance with one embodiment, a panel mold 400 as shown in FIG. 4 is first provided. The panel mold 400 is sized and shaped according to the decorative panel 100 to be manufactured. The 3D surface of the panel mold 400 is a mirror image of the 3D surface of the decorative layer 302 of the panel 100 to be manufactured.

Figure 5:
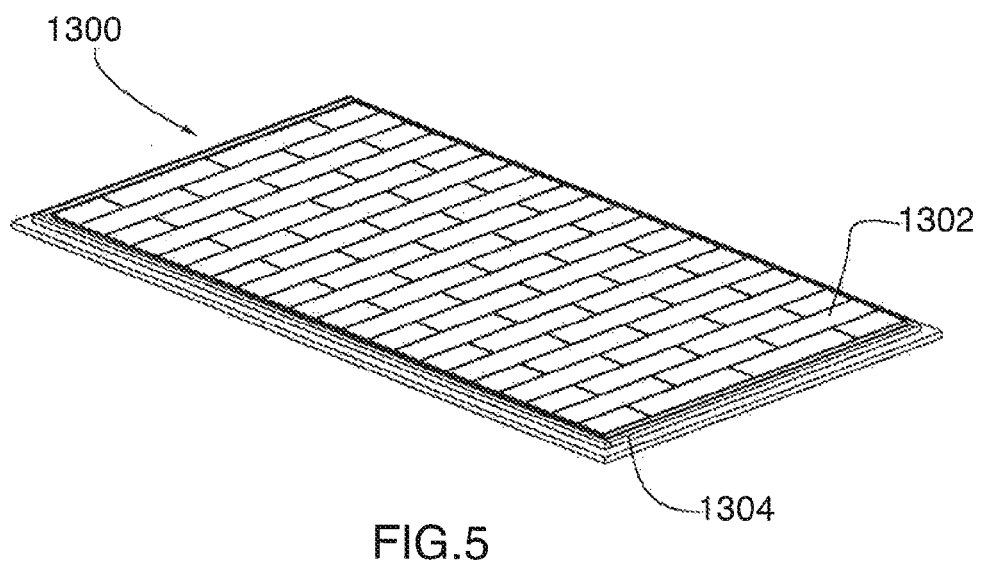
FIG. 5 is a perspective view of the panel mold of FIG. 4.
Figure 6:
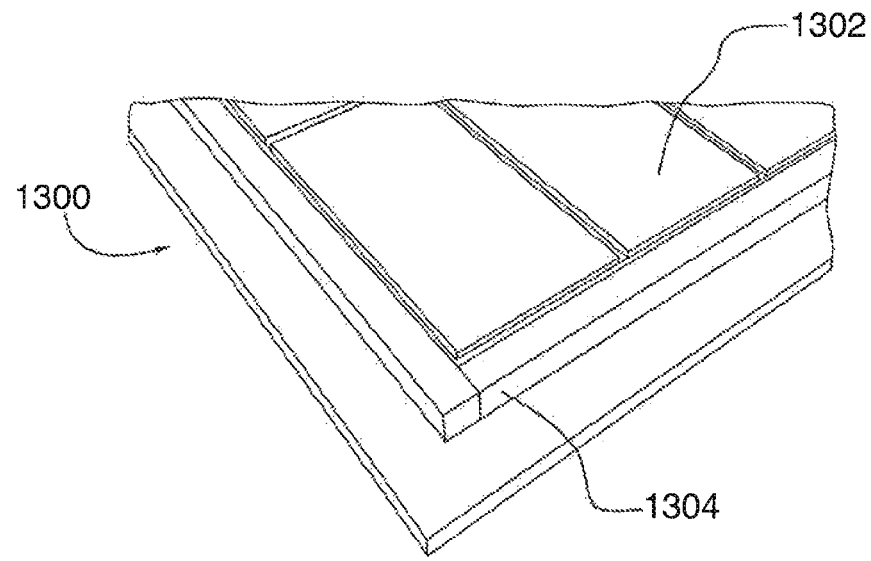
FIG. 6 is a schematic representation showing an enlarged view of the panel mold of FIG. 5.
Figure 15:
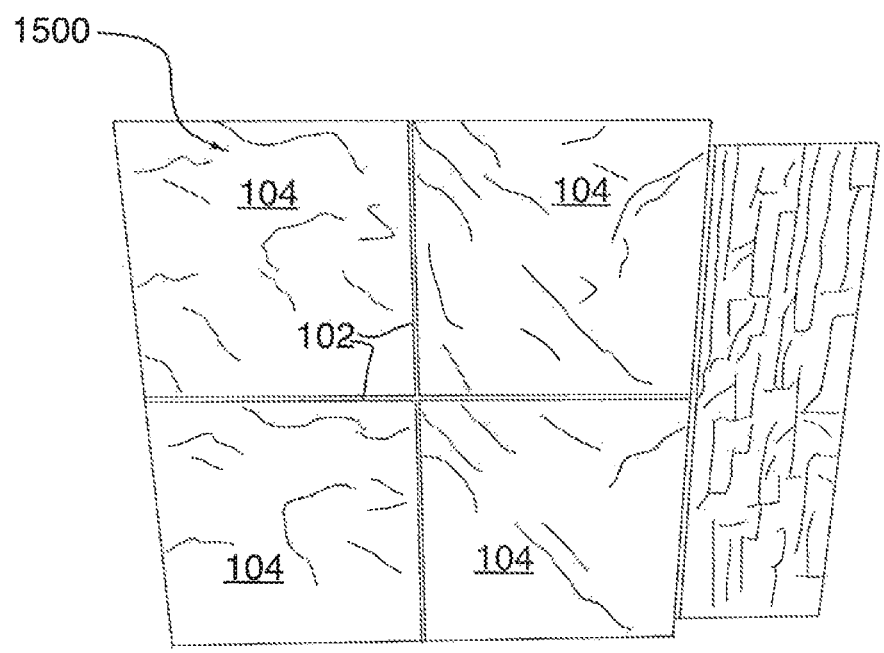
FIG. 15 is a perspective view of a decorative panel, in accordance with an alternative embodiment in which the decorative panel is shaped as a floor panel for a shower.

In one embodiment, the panel mold 400 comprises a unitary body manufactured by molding using a matrix 1300, shown in FIGS. 5 and 6, which corresponds to a negative imprint of the panel mold 400. The matrix 1300 may be manufactured using standard tiles 1302 and grout installed in a frame 1304 using a conventional tiling method. The tiles 1302 and the grout between the tiles 1302 will create the grid configuration of the ridges 404 when the panel mold 400 is molded, as one skilled in the art will appreciate. To obtain a decorative panel on which the tiles are textured, such as the decorative panel shown in FIG. 15, the tiles 1302 may be textured. When the panel mold 400 is molded, the textured tiles 1302 create a negative image of the texture on the interior surface 508 of the recesses 506 of the panel mold 400, which in turn will create a negative image of the recesses, and thus a positive image of the texture, on the tile portions of the decorative panel when the decorative panel is molded. Alternatively, the tiles 1302 may instead be untextured. In this embodiment, the tiles 1302 create a planar interior surface 508 in the recesses 506 when the panel mold 400 is molded using the matrix 1300. Texture may then be engraved in the interior surface 508 using engraving techniques known to the skilled addressee. For instance, the texture may be engraved using a programmed numerical control engraving or milling machine, or a laser engraving machine which uses a laser.

In another embodiment, the matrix 1300 is instead manufactured using a rigid board in which grooves are machined to match the groove segments in the decorative panel 100 to be manufactured. The grooves may be machined manually or using a computer numerical control machine tool in which the appropriate pattern has been programmed.

In yet another embodiment, the mold 400 is manufactured using engraving techniques known to the skilled addressee instead of using a matrix. For instance, the mold 400 may be engraved from a block or sheet of suitable material using a programmed numerical control engraving or milling machine, or a laser engraving machine which uses a laser. The person skilled in the art will acknowledge that there exist multiple methods to produce a mold suitable for use in accordance with the method disclosed herein.

The panel mold 400 may be manufactured using a thermoplastic, a thermosetting plastic, a thermoplastic elastomer, silicone, aluminum or any other material deemed suitable by the skilled addressee.

Figure 7:
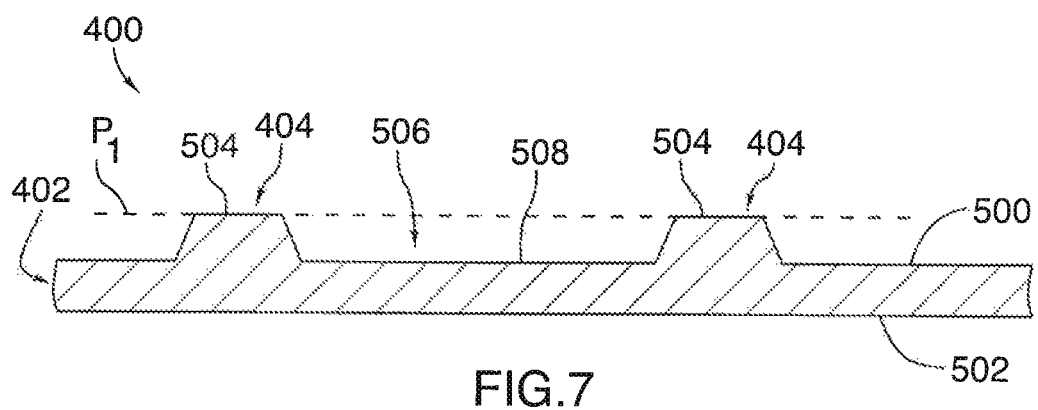
FIG. 7 is a schematic representation of the panel mold shown in FIG. 4, in cross-section.

Turning now to FIG. 7, the panel mold 400 comprises a base panel 402 having a first face 500, an opposite second face 502 and a plurality of ridges or protrusions 404 projecting from the first face 500 of the base panel 402. The ridges 404 are disposed so as to form a desired indented pattern in the decorative panel 100 to be manufactured when the decorative panel 100 is molded. In the illustrated embodiment, the ridges 404 are disposed in a grid configuration which corresponds to the indented grid pattern of the decorative panel 100, as illustrated in FIGS. 4 and 5. A person skilled in the art will understand that the grid configuration of the ridges 404 is substantially a "negative" image of the "faux tile" pattern of the decorative panel 100.

Each one of the ridges 404 has a top surface 504 located away from the first face 500 of the base panel 402. In the embodiment shown in FIG. 7, the top surface 504 of all the ridges 404 are disposed along a common plane $P_1$ to facilitate the application of the overlay polymer 306 during manufacturing of the decorative panel 100, as will be further explained below.

Alternatively, two or more top surface portions 504 may be disposed along a first plane, while one or more other top surface portions 504 may be disposed along a second plane. In this embodiment, the top surface portions 504 may be coated with a first overlay polymer having a first color, while the other top surface portions 504 may be coated in a separate operation with a second overlay polymer having a second color, as will become apparent below.

In the illustrated embodiment, the ridges 404 are generally straight and intersect each other to define a plurality of generally rectangular recesses 506 between the ridges 404, which will create the tile portions of the decorative panel 100, e.g. tile portion 104, as illustrated in FIGS. 4 and 5. Each one of the recesses 506 has an interior surface 508, which may be textured to create a textured top surface on the tile portions, as shown on a decorative panel 1500 illustrated in FIG. 15.

The panel mold 400 is sized and shaped according to the configuration of the decorative panel 100 to be manufactured. For instance, to manufacture a wall panel of a shower, such as the shower 150 shown in FIG. 1, the panel mold 400 is generally rectangular and is sized according to the height and width of the shower 150. Alternatively, to manufacture a decorative panel for use as a floor of a shower, such as the decorative panel 1500 shown in FIG. 15, the panel mold 400 may be shaped to include a generally square floor portion and a smaller rectangular threshold portion adjacent the floor portion.

Returning to the method of manufacturing the decorative panel, once the panel mold 400 is provided, a layer of barrier coating, if any, is applied on the ridges 404 and on the interior surface 508 of the recesses 506.

Figure 8:
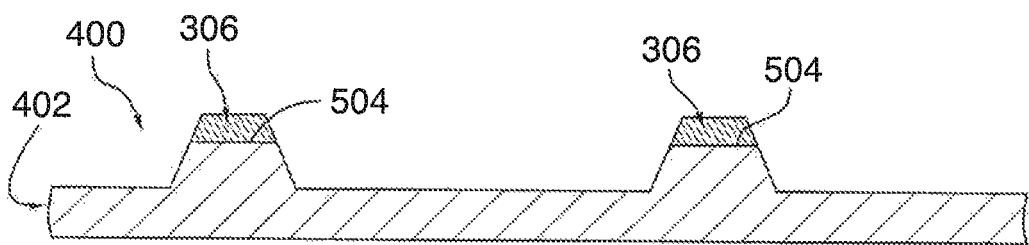
FIG. 8 is a schematic representation of the panel mold shown in FIG. 4, in cross-section with the overlay polymer applied on the ridges of the panel mold.

The overlay polymer 306 is then applied on the ridges 404 of the panel mold 400, as shown in FIG. 8. It should be understood that any adequate method for applying the overlay polymer on the top surfaces 504 of the ridges 404 may be used. For example, the overlay polymer may be sprayed, applied with a polymer applicator, etc.

Figure 9:
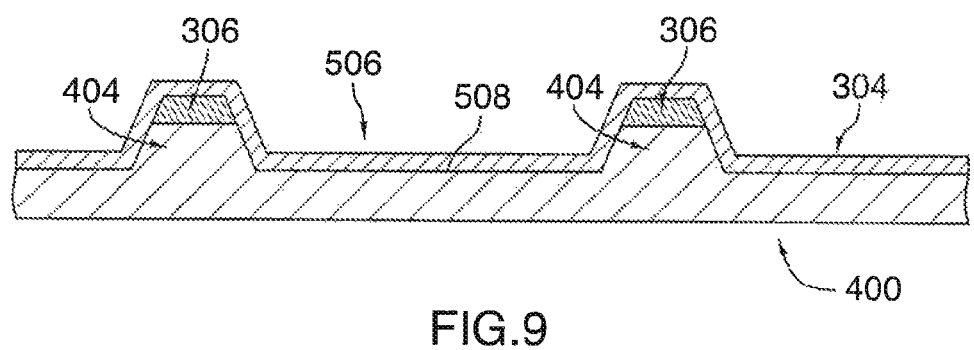
FIG. 9 is a schematic representation of the panel mold shown in FIG. 4, in cross-section, with the overlay polymer applied.

Once the layer of overlay polymer 306 has been applied on the panel mold 400, the layer of the base polymer 304 is applied on the panel mold 400, as shown in FIG. 9. More specifically, the base polymer 304 is applied on the interior surface 508 of the recesses 506, as well as on the overlay polymer 306 which was previously applied on the ridges 404.

In one embodiment, the base polymer 304 is applied by spray painting using a spray gun or any other paint spraying device deemed suitable by the skilled addressee. This advantageously allows the layer of the base polymer 304 to be applied quickly and substantially uniformly on the panel mold 400.

In one embodiment, the layer of the base polymer 304 is applied while the overlay polymer 306 is still wet, a process known in the art as "wet-on-wet painting". This advantageously enables the overlay polymer 306 and the base polymer 304 to polymerize together. It will be appreciated that this reduces the time required to manufacture the decorative panel and thus also reduces the cost associated with manufacturing the decorative panel.

Alternatively, the overlay polymer 306 may be dried prior to the application of the layer of the base polymer 304.

Once the layer of the base polymer 304 has been applied, the base polymer 304 and the overlay polymer 306 are allowed to dry. In one embodiment, the drying of the base polymer 304 and the overlay polymer 306 is carried out by letting them dry in ambient conditions for a sufficient period of time. For instance, in one embodiment, the drying time is about 40 minutes.

Alternatively, the layer of the base polymer 304 and the overlay polymer 306 may instead be dried using a drying device such as a low temperature oven or any other drying device deemed suitable by the skilled addressee. It will be appreciated that this would reduce the time required for the layer of the base polymer 304 and layer of the overlay polymer 306 to dry.

Figure 10:
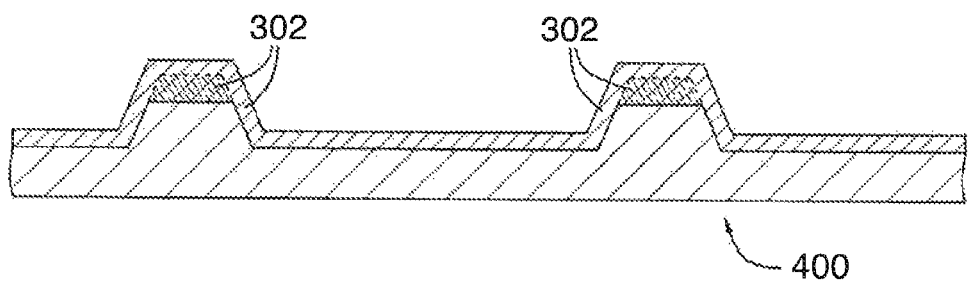
FIG. 10 is a schematic representation of the panel mold shown in FIG. 4, in cross-section, with the overlay polymer and the base polymer polymerized together to form an integral decorative layer.

It will be appreciated that once the base polymer 304 and the overlay polymer 306 are substantially dry, they are polymerized together to define an integral structure, in this case the decorative layer 302, as shown in FIG. 10. This advantageously prevents the overlay polymer 306 from peeling off from the layer of the base polymer 304 due to wear and tear.

Figure 11:
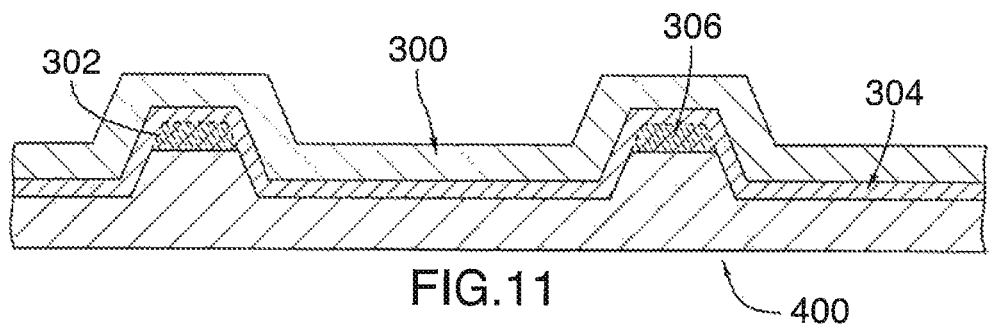
FIG. 11 is a cross-section view of the panel mold shown in FIG. 11, with the backing layer applied over the decorative layer.

Once the base polymer 304 and the overlay polymer 306 have been dried, the backing layer 300 is applied on the layer of the base polymer 304, as shown in FIG. 11. It should be understood that any adequate method for applying the backing layer 300 on the base polymer layer 304 may be used, and may be made of any adequate material adapted to adhere to the base polymer layer 304 and provide substantial rigidity and structural strength to the decorative panel.

In an embodiment in which the top surface 504 of all the ridges 404 are located on a common plane $P_1$, the overlay polymer 306 may be applied with a polymer applicator on two or more surface portions simultaneously. The polymer applicator, containing the overlay polymer 306, is first positioned adjacent the at least two surface portions, and the overlay polymer 306 is transferred from the polymer applicator onto two or more surface portions simultaneously.

Figure 12:
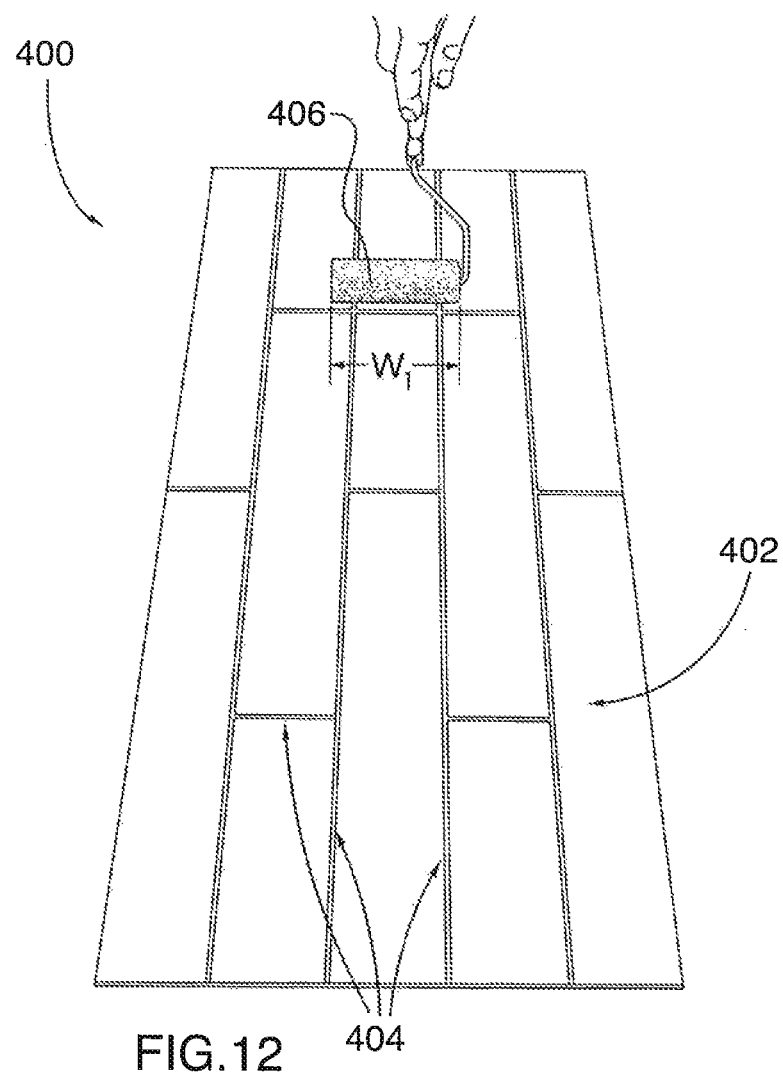
FIG. 12 is a schematic representation the panel mold shown FIG. 4 with an operator using a paint roller to apply the overlay polymer on ridges of the panel mold.

In the embodiment shown in FIG. 12, the polymer applicator is a paint roller 406, which has a width $W_1$. The paint roller 406 may comprise a short hair paint roller, a foam paint roller, a rubber paint roller or any other known roller deemed suitable by the skilled addressee. In this embodiment, two or more top surfaces 504 of the ridges 404 are spaced by a distance which is smaller than the width $W_1$. The paint roller 406, which is covered in the overlay polymer 306, is first placed in contact simultaneously with these two top surfaces 504, and is then rolled over the top surfaces 504 to thereby cover these surfaces with the overlay polymer 306.

In the embodiment shown in FIG. 12, the paint roller 406 is moved over the ridges 404 manually. Alternatively, the paint roller 406 may be moved by a programmed painting machine. This would advantageously reduce the time required to apply the overlay polymer 306 and would make the application of the overlay polymer 306 more precise.

In another embodiment, the overlay polymer 306 is applied using one of various other techniques, such as by spraying the overlay polymer 306 in a substantially narrow and precise stream over the top surfaces 504 of the ridges 404.

In a further embodiment, the overlay polymer layer is applied using a mask plate technique (not shown). According to this embodiment, mask plates are placed in recesses 506 prior to applying the overlay polymer layer 306 on the top surface 504 of the ridges 404. Each mask plate is sized and shaped to fill a respective recess 506 so that it prevents overlay polymer be applied in the recesses 506. In one embodiment, the shape of each mask plate is a mirror image of its respective recess 506 so that, when placed in a corresponding recess, the top/front surface of each mask plate be substantially coplanar with the top surface 504 of the ridges 404 surrounding the mask plate. Therefore, when the overlay polymer is applied on the top surface 504 of the ridges 504, the mask plates prevent any overlay polymer from leaking in the recesses 506 and adhering to the interior surfaces 508 thereof. Once the overlay polymer has been applied to the top surface 504 of the ridges 404, the mask plates are removed from the their respective recesses 506, and a second polymer layer may be applied, as described below. In an embodiment in which the overlay polymer is sprayed on the top surface 504 of the ridges 404 and mask plates are used, the layer of the overlay polymer 306 may be applied quickly and substantially uniformly on the panel mold 400 while ensuring that the overlay polymer be only applied to the surface 504 of the ridges 404.

Figure 13:
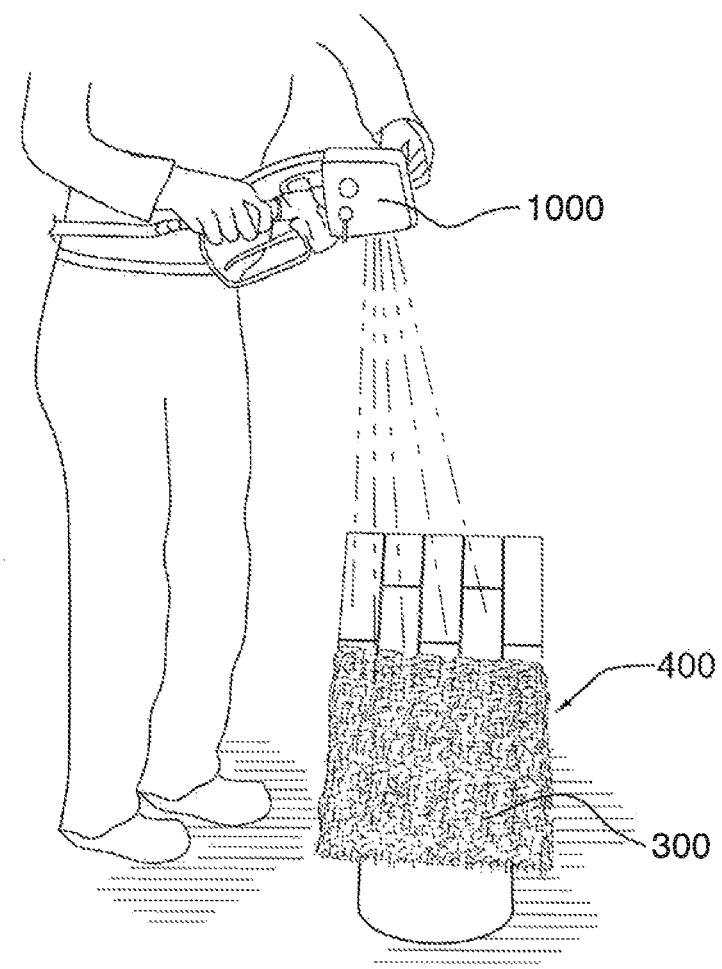
FIG. 13 is a schematic representation showing the panel mold shown in FIG. 4, with the backing layer being applied over the base polymer by an operator using a spray gun.
Figure 14:
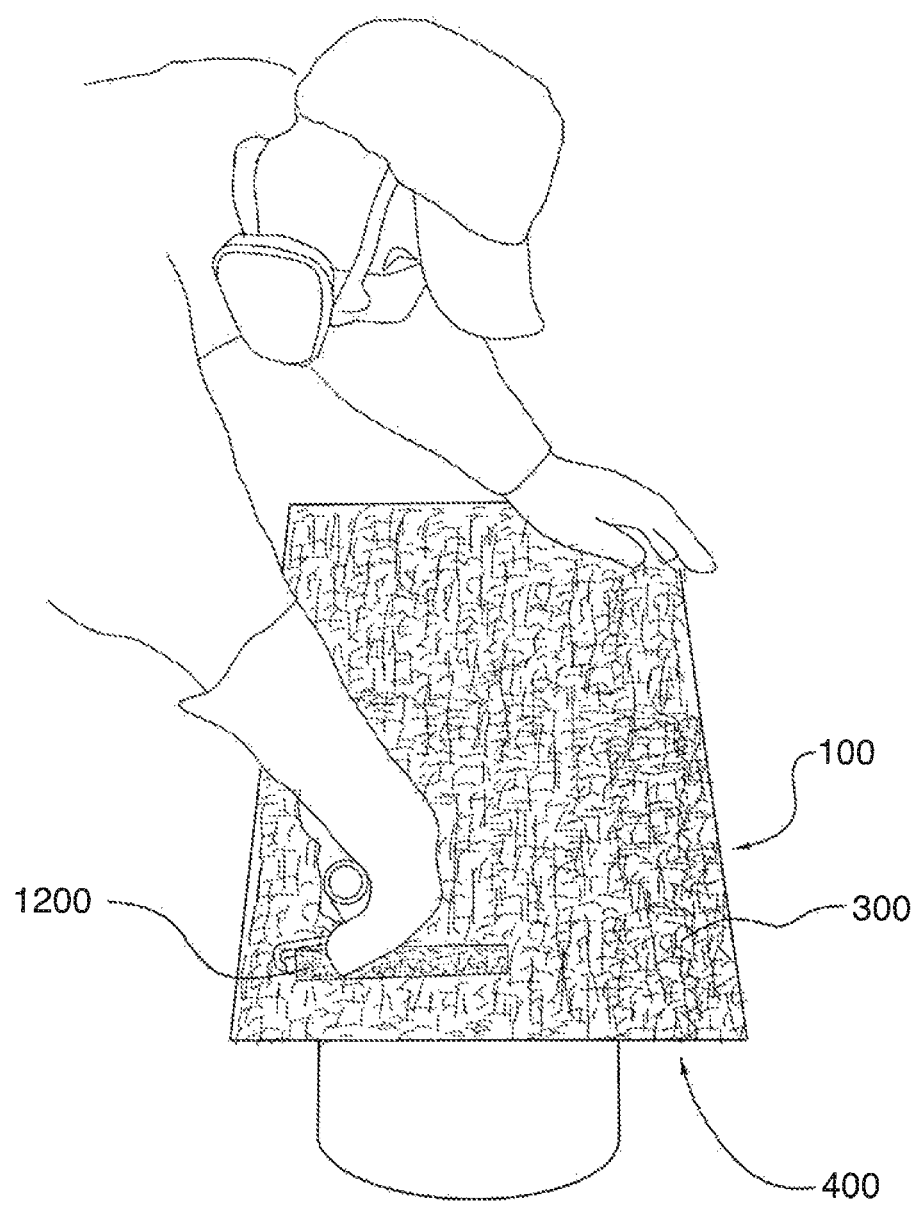
FIG. 14 is a schematic representation showing the panel mold shown in FIG. 4, with an operator leveling the backing layer using a roller.

In one embodiment, the backing layer 300 is manufactured using a mixture of fiberglass and polyester resin, which may be applied by spraying using a technique known in the art as "fiberglass spray lay-up". The fiberglass mixture is sprayed substantially uniformly on the layer of the base polymer 304, using a spray gun 1000 as shown in FIG. 13 for instance, and then leveled using a roller 1200, as shown in FIG. 14, or a similar device to remove air bubbles from the fiberglass mixture.

The fiberglass mixture is then allowed to cure to solidify the backing layer 300, thereby creating a decorative panel 100 which is substantially rigid. In one embodiment, the curing of the fiberglass mixture is performed using an oven. A catalyst may further be added to the fiberglass mixture prior to or after spraying to facilitate the curing of the fiberglass mixture.

In one embodiment, a layer of overlay gelcoat polymer having a thickness of 0.006 inches is first applied on the top surfaces 504 of the ridges 504. For example, the overlay gelcoat polymer may be composed of a mixture of styrene monomer and unsaturated polyester. Then, a layer of base catalyzed gelcoat is applied on the first layer of overlay gelcoat polymer and the uncovered portions of the panel mold 400. For example, the catalyzed gelcoat may be composed of unsaturated polyester with 5% per weight benzoyl peroxide catalyst. The layer of base catalyzed gelcoat polymer is applied on the overlay gelcoat polymer while the overlay gelcoat polymer is still wet, and the catalyst contained in the layer of base catalyzed gelcoat helps the layer of base catalyzed gelcoat and the layer of overlay gelcoat polymer polymerizing together to form an integral assembly.

The mold comprising the layer of base catalyzed gelcoat polymer and the layer of overlay gelcoat polymer is then heated at a temperature of at least about 20° C. for about 45 minutes. Then, a fiberglass backing layer having a thickness of about 2 mm is applied on the cured layer of base catalyzed gelcoat polymer. For example, the backing fiberglass layer 300 may be made of a mixture of the following materials: resin, filler such as calcium sulfate, catalyst such as Luperox™ DDM-9, pigment, and fiberglass such as 2400 TEX fiberglass. For example, the resin may comprise a mixture of polyester and styrene. Once it has been applied, the backing fiberglass layer may be leveled using a roller such as roller 1200 or a similar device to remove air bubbles from the fiberglass mixture, create a substantially smooth surface, and/or ensure that the components of the backing fiberglass layer are substantially uniformly mixed together.

Optionally, structurally reinforcing elements such as oriented strand board, wood plates, cardboards, and polyvinyl chloride plates may be positioned on top of the backing fiberglass layer at desired locations in order to increase the stiffness for the decorative panel and optimize the subsequent installation of the decorative panel. A second backing fiberglass layer having a thickness of about 1 mm is then applied over the structurally reinforcing elements and the portions of the first backing fiberglass layer that are not covered by the structurally reinforcing elements, if any. The second backing fiberglass layer may then be leveled using a roller such as roller 1200.

The mold comprising the different layers is then heated at a temperature of at least about 20° C. for about 90 minutes, thereby allowing the backing layers to dry and solidify.

Once the backing layer 300 has been solidified, the decorative panel 100 is removed from the panel mold 400. The decorative layer 302 of the decorative panel 100 may then be finished using a finishing technique known to the skilled addressee.

In one embodiment, the decorative panel 100 may further be cut to define openings therein. For instance, a circular opening may be cut through the decorative panel 100 to define a drain for a shower floor. It will be appreciated that a decorative panel 100 made of gelcoat and fiberglass is relatively easy to machine and therefore advantageously allows the openings to be cut relatively easily.

It will be appreciated that once the decorative panel 100 has been removed from the panel mold 400, the panel mold 400 may be re-used to mold another similar decorative panels, using the same method described above.

Figure 16:
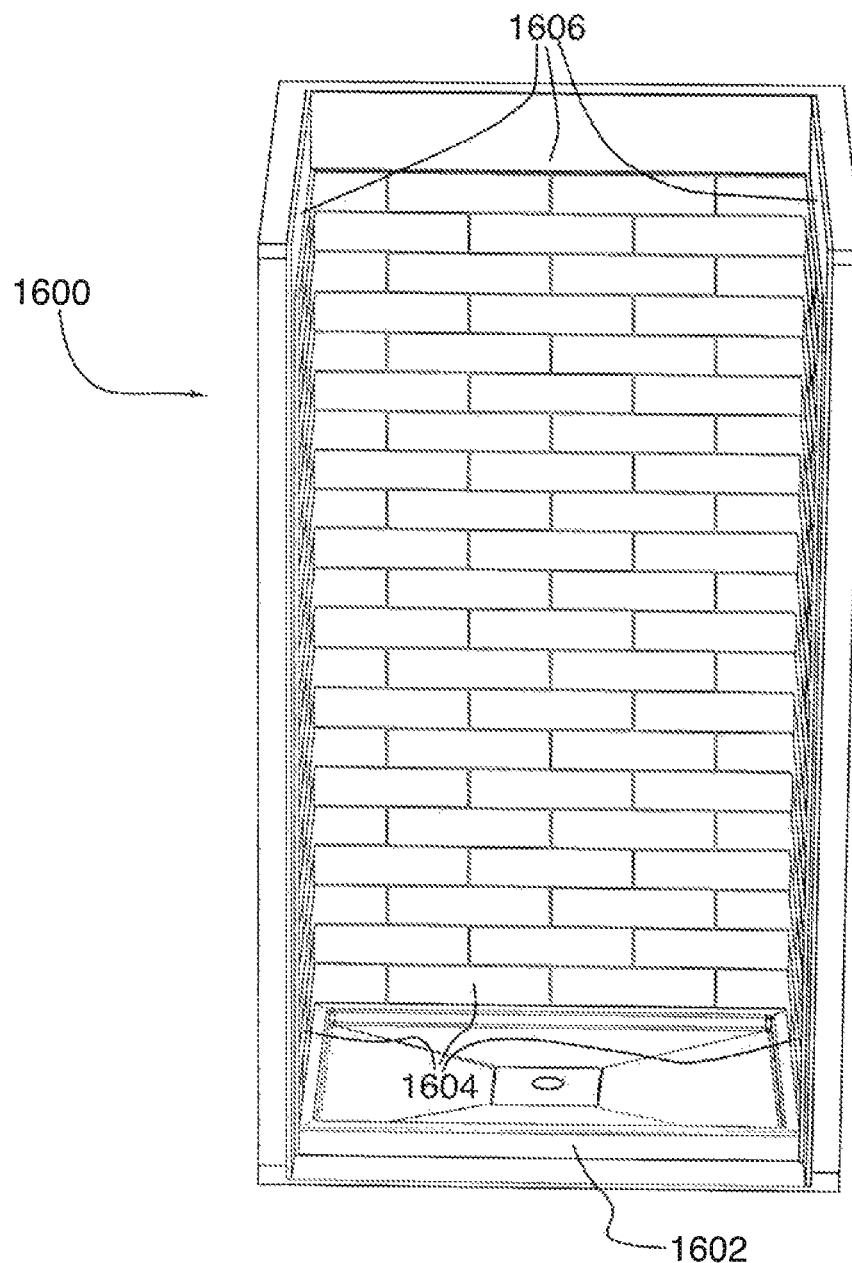
FIG. 16 is a front perspective view of a shower stall in accordance with one embodiment.
Figure 17:
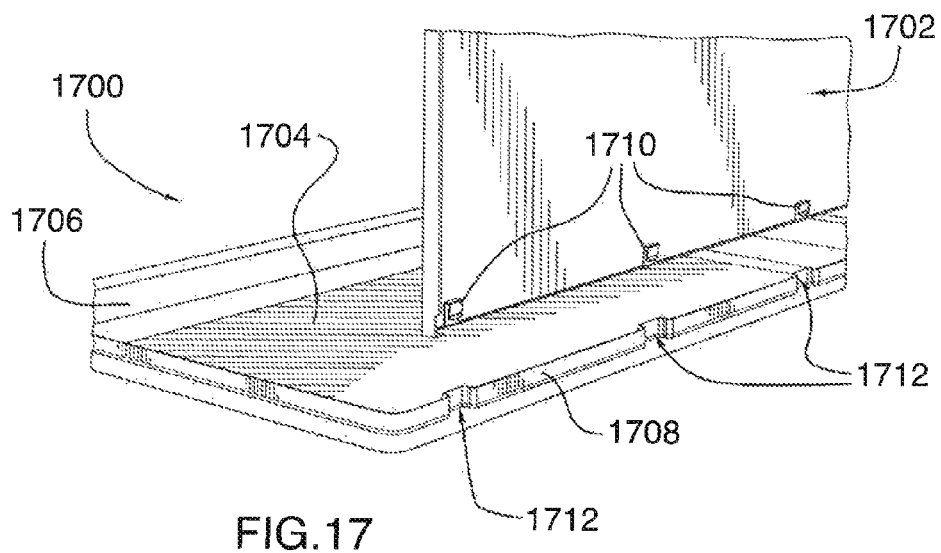
FIG. 17 shows a kit for assembling a shower with the shower base and the decorative panel disassembled.
Figure 18:
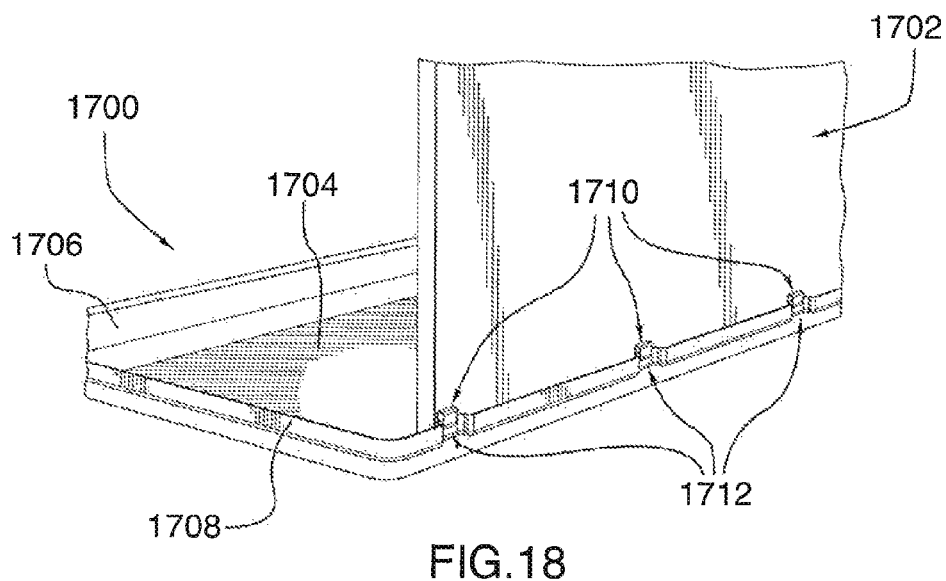
FIG. 18 illustrates the kit for assembling a shower shown in FIG. 17, with the shower base and the decorative panel assembled.
Figure 19:
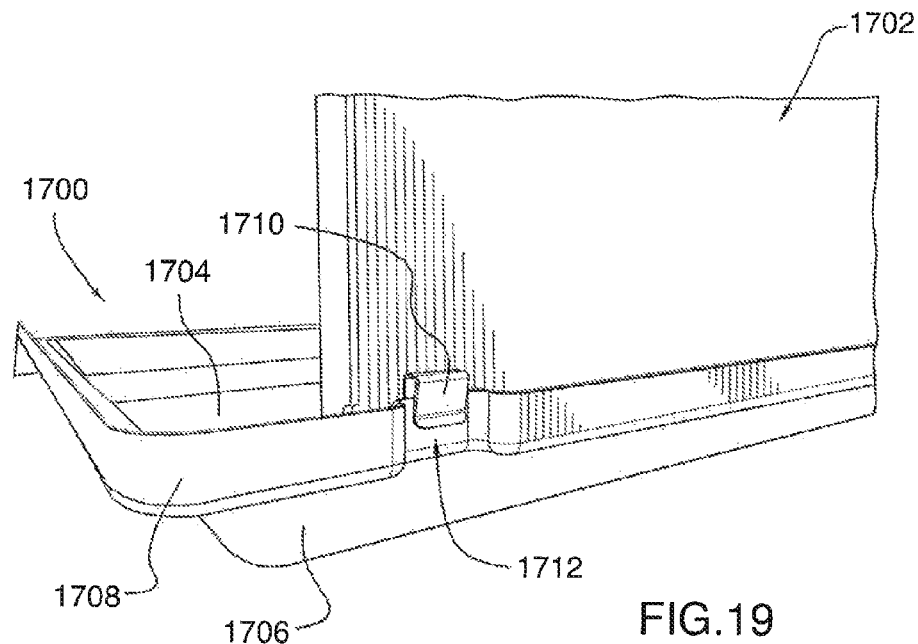
FIG. 19 is an enlarged view of the kit shown in FIG. 17, for better showing a clip for assembling the decorative panel to the shower base.
Figure 20:
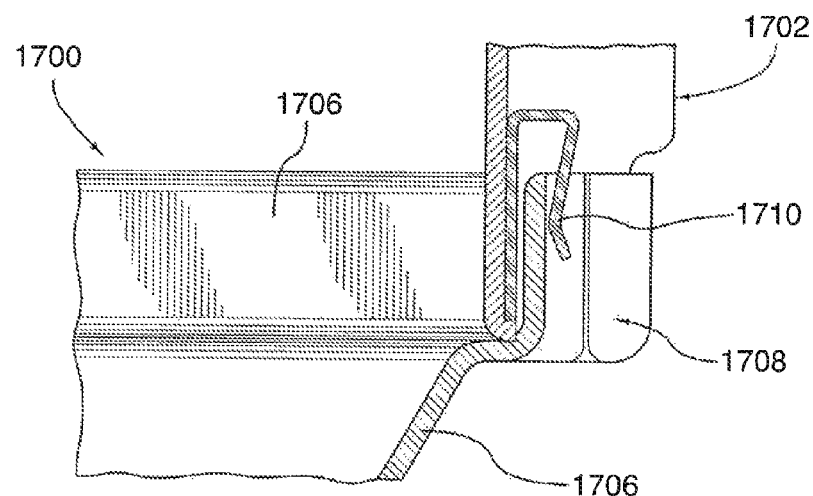
FIG. 20 is a cross-section view of the kit shown in FIG. 19, for better showing the clip.

A person skilled in the art will appreciate that decorative panels made in accordance with the above-described method may find use in many applications. For instance, decorative panels may be use in the manufacture or assembly of shower stalls. For instance, FIG. 16 shows a shower 1600 in accordance with one embodiment. The shower 1600 comprises a shower base 1602 and three decorative panels 1604, similar to the decorative panel 100, mounted to the shower base and placed against three walls 1606 to define an "alcove" configuration. It will be appreciated that the shower base 1602 and the decorative panels 1604 may be provided together or separately as a kit to assemble a shower.

An example of such kit to assemble a shower is illustrated in FIGS. 17 to 20. In the illustrated embodiment, the kit for assembling a shower comprises a shower base 1700 and a decorative panel 1702. The shower base 1700 comprises a floor 1704, a perimeter wall 1706 surrounding the floor 1704 and a mounting flange 1708 extending upwardly from the perimeter wall 1706. One or more fasteners are further provided to mount the decorative panel 1702 to the shower base 1700. In the illustrated embodiment, the fasteners comprise a plurality of clips 1710 which are configured to engage the mounting flange 1708. Specifically, the mounting flange 1708 comprises a plurality of receiving portions 1712, one for each clip. The receiving portions 1712 are indented inwardly towards the floor 1704 to prevent the clips 1710 from extending beyond the mounting flange 1708, away from the floor 1704. When the shower base 1700 is placed against a wall (not shown), this configuration prevents the clips 1710 from interfering with the wall, as can be understood from FIG. 20.

It will be appreciated that although only one decorative panel 1702 is illustrated in FIGS. 17 to 20, the shower base 1700 may alternatively be configured other decorative panels may be provided and assembled to in a similar manner.

Figure 21:
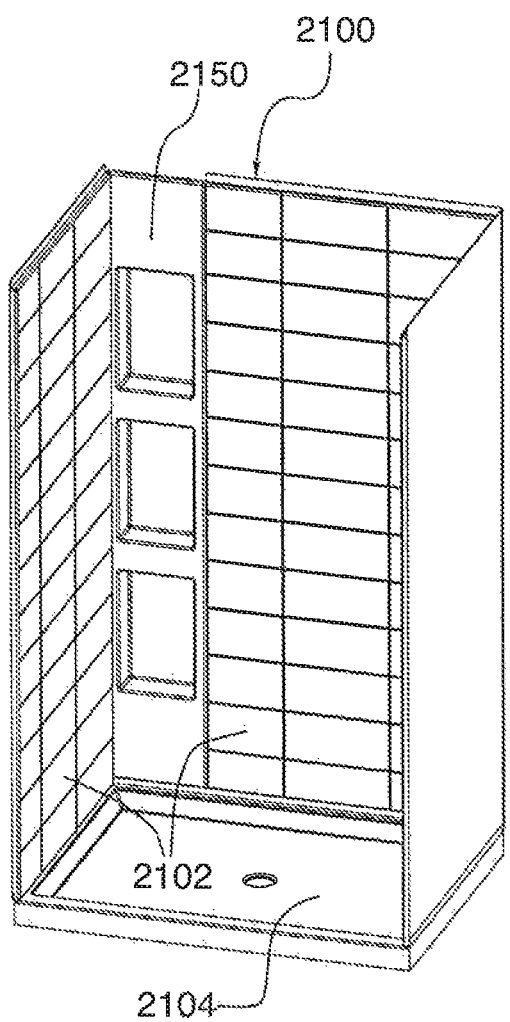
FIG. 21 is a front perspective view of a shower stall in accordance with another embodiment.
Figure 22:
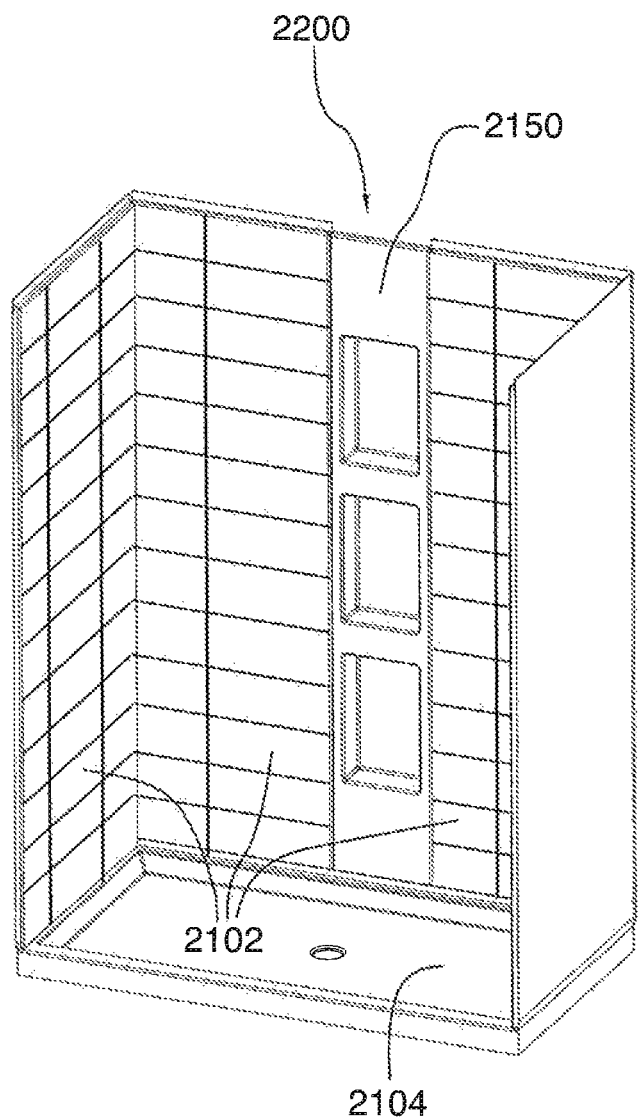
FIG. 22 is a front perspective view of a shower stall in accordance with a further embodiment.
Figure 23:
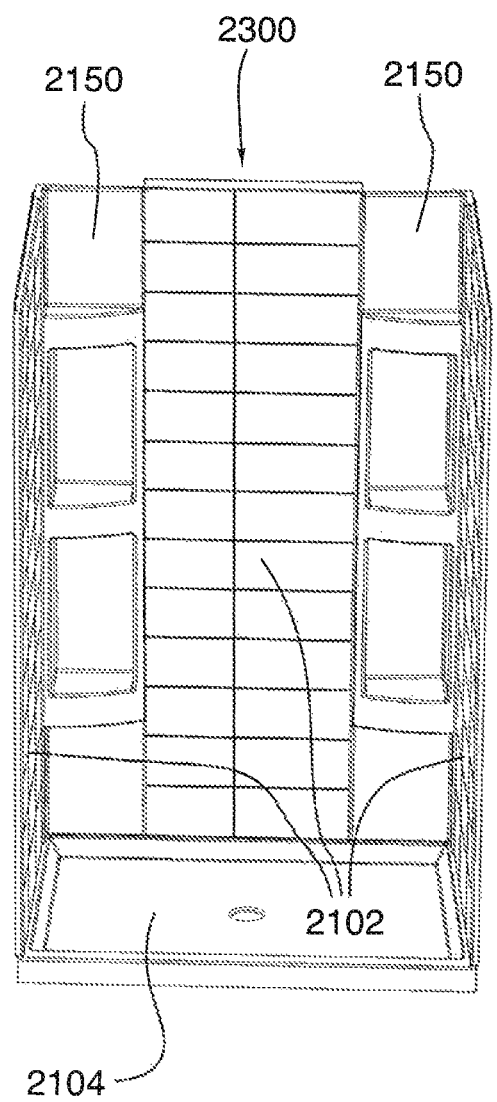
FIG. 23 is a front perspective view of a shower stall in accordance with yet a further embodiment.

FIGS. 21 to 23 show various other configuration of showers 2100, 2200, 2300, each comprising decorative panels 2102 mounted to a shower base 2104. All of those showers 2100, 2200, 2300 comprise one or more recessed storage panel 2150 which may be used to store bathroom articles. The recessed storage panel 2150 does not comprise any relief elements, and may therefore be manufactured using conventional techniques.

Figure 24:
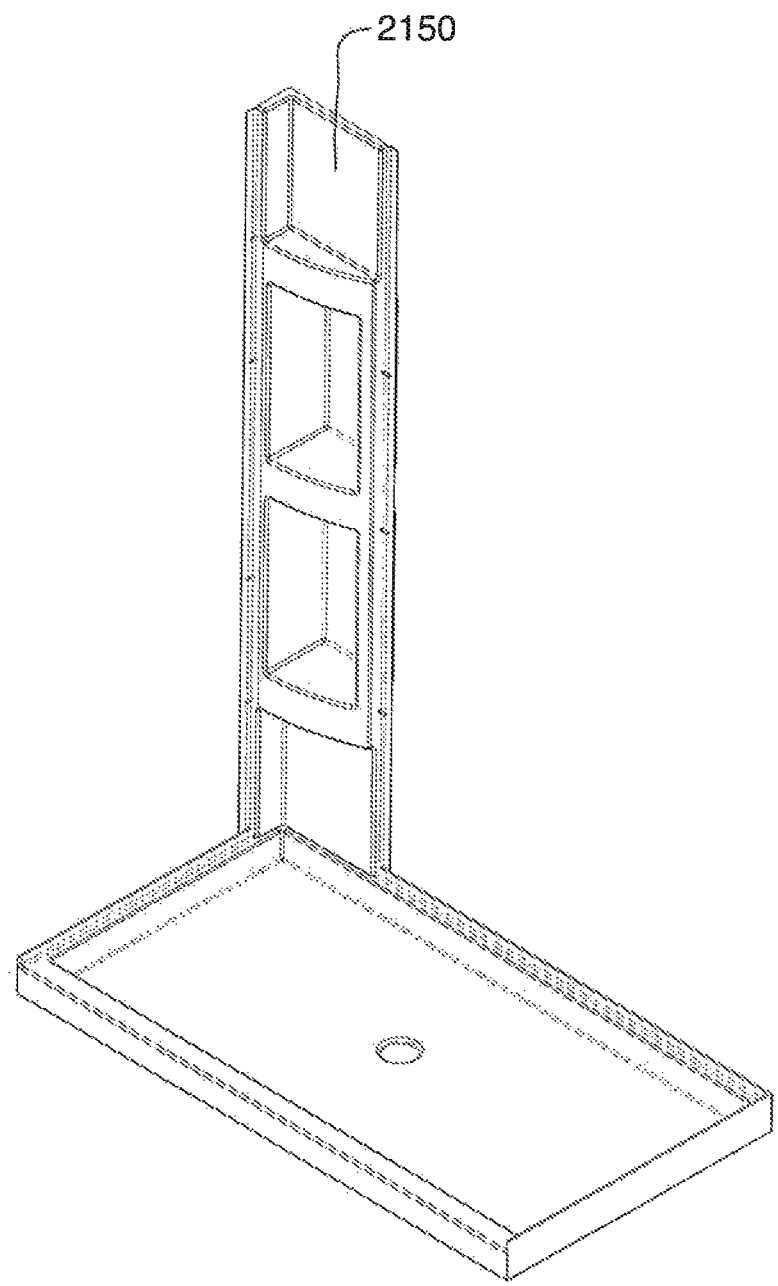
FIG. 24 is a front perspective view of the recessed storage panel of the shower stall shown in FIG. 23, mounted to the base.
Figure 25:
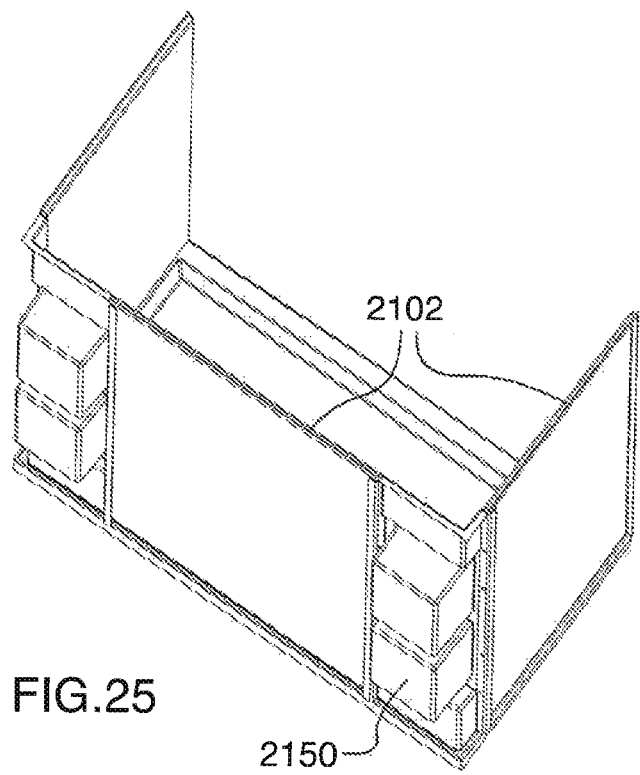
FIG. 25 is a top rear perspective view of the recessed storage panel of FIG. 24.
Figure 26:
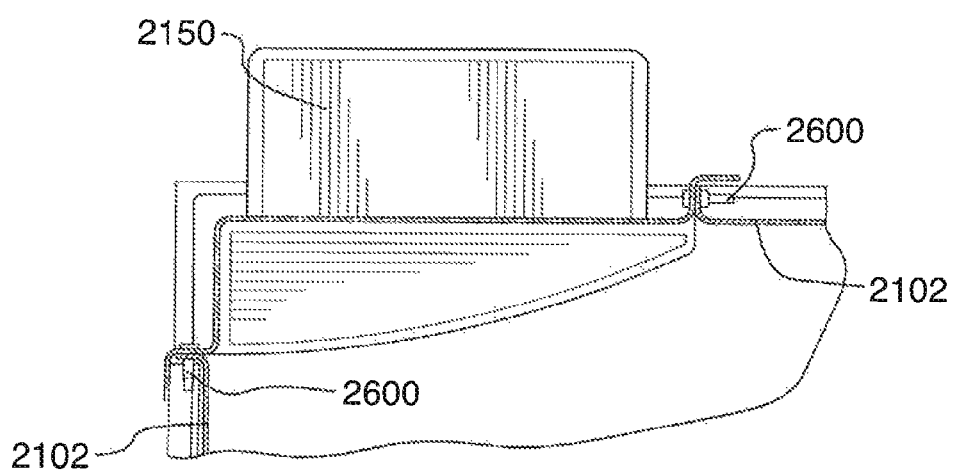
FIG. 26 is a top plan view of the recessed storage panel shown in FIG. 24.

Referring to FIGS. 24 to 26, the recessed storage panel 2150 is assembled to adjacent panels using a fastening assembly 2600. An example of such fastening assembly is disclosed in US Patent Publication US 2010/0104398 to Lemire et al., incorporated herein by reference.

Figure 27:
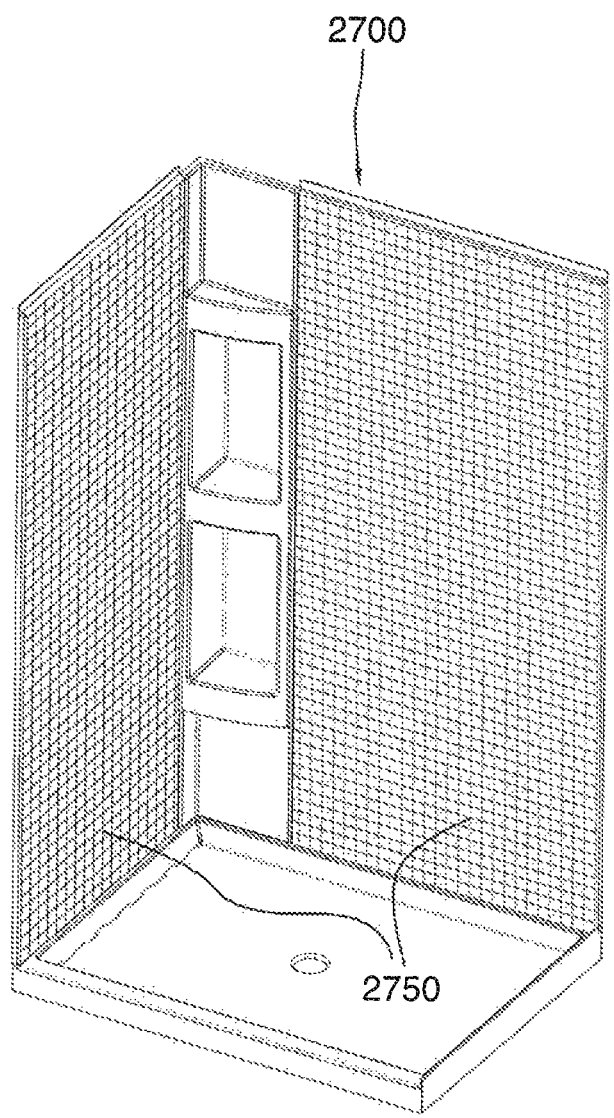
FIG. 27 is a front perspective view of a shower stall in accordance with one embodiment.
Figure 28:
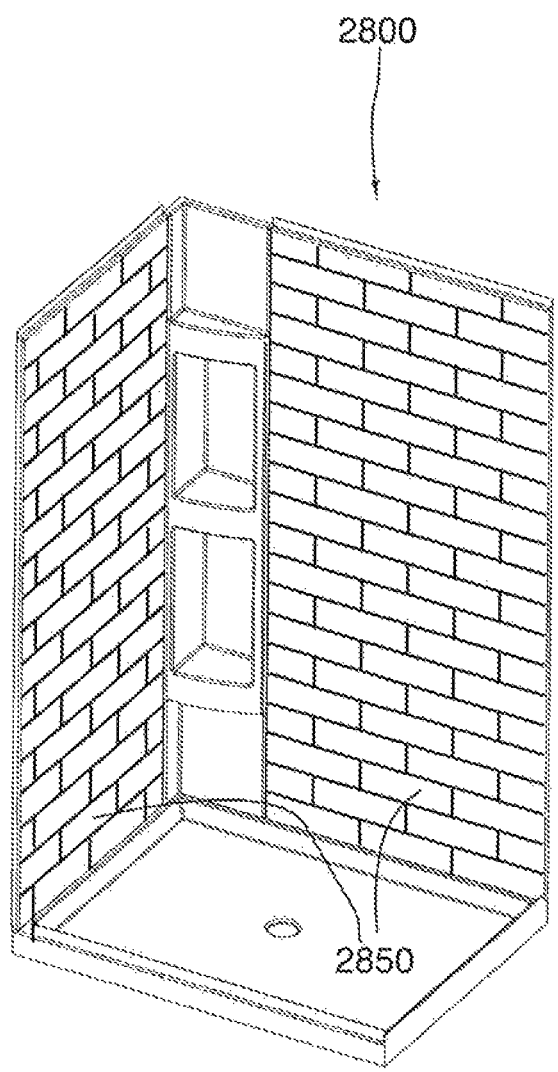
FIG. 28 is a front perspective view of a shower stall in accordance with another embodiment.

FIGS. 27 and 28 show other showers 2700, 2800 provided with decorative panels 2750, 2850 having tiled patterns which are different from the tiled pattern shown in FIGS. 1 to 26.

Figure 29:
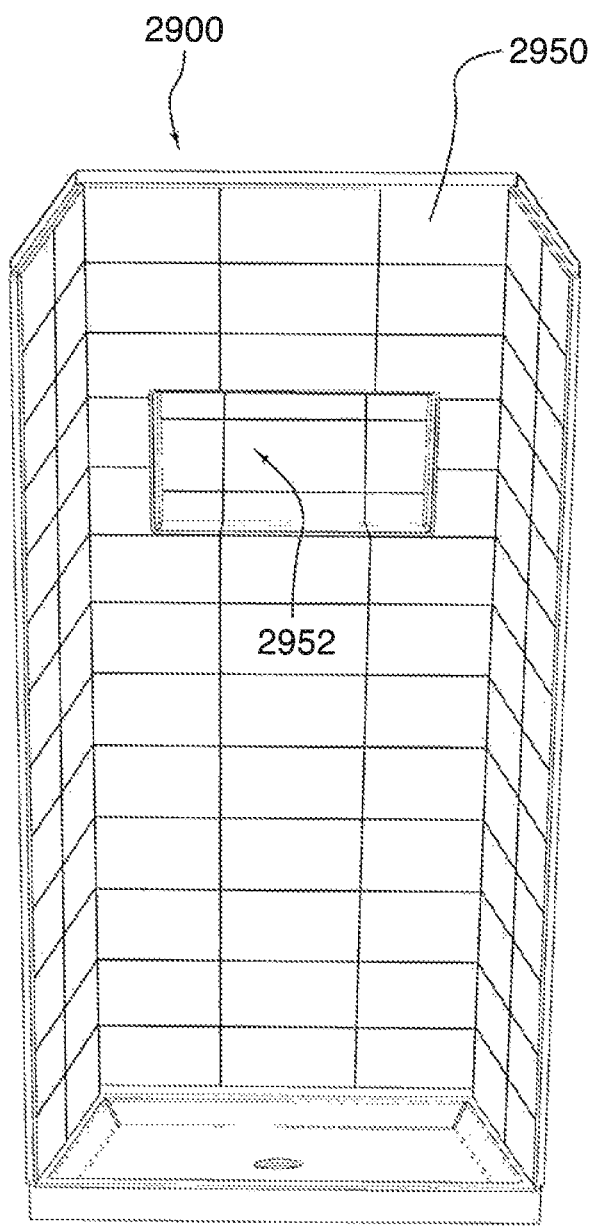
FIG. 29 is a front perspective view of a shower stall in accordance with yet another embodiment.
Figure 30:
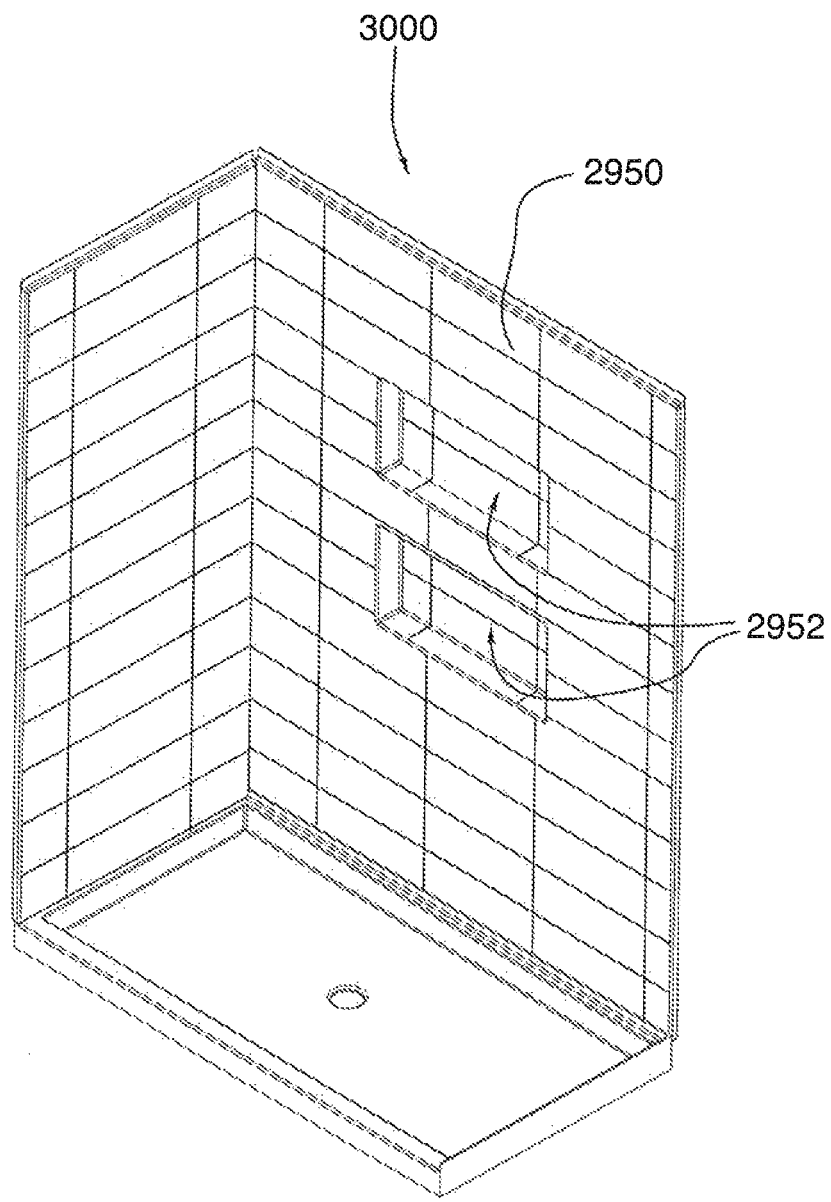
FIG. 30 is a front perspective view of a shower stall in accordance with still another embodiment.

FIGS. 29 and 30 show further shower configurations 2900, 3000, according to alternative embodiments. In those embodiments, instead of providing recessed storage panels which do not comprise any relief elements, the showers 2900, 3000 are provided with decorative panels 2950 in which recesses 2952 are directly defined. This configuration may be obtained by manufacturing the decorative panels 2950 with appropriately shaped panel molds, as one skilled in the art will appreciate.

Although FIGS. 1 to 30 show decorative panels used in showers, it will be appreciated that the decorative panel may alternatively be used in other applications. For instance, the decorative panel may be used to cover a wall of a bathroom, of a kitchen or of any other room which may be deemed suitable by the skilled addressee.

Alternatively, the decorative panel 100 could be a "faux-tile" or "faux-stone" panel for use as a kitchen backsplash or decorative purposes in various rooms of a residential or commercial building.

Although the present description refers to a "decorative" panel, a person skilled in the art will understand that the panel may perform additional functions, such as providing structural strength to a structure, for instance, or provide water and/or gas insulation.

Although the above description relates to a specific preferred embodiment as presently contemplated by the inventor, it will be understood that the invention in its broad aspect includes mechanical and functional equivalents of the elements described herein.

The invention claimed is:

1. A decorative panel comprising:
   a backing layer having a back face for abutting a panel-receiving surface and a front face opposite to the back face, the front face of the backing layer including a relief element;
   a relief decorative layer attached to the front face of the backing layer and comprising:
      a layer of base polymer attached to the front face of the backing layer and covering the front face of the backing layer entirely, the layer of base polymer having a substantially constant thickness across the front face of the backing layer; and
      a layer of overlay polymer attached to the layer of base polymer and covering a portion thereof, the layer of overlay polymer corresponding to the relief element, wherein the overlay polymer and the base polymer are polymerized together to define an integral structure.

2. The decorative panel as claimed in claim 1, wherein the overlay polymer and the base polymer have different colors.

3. The decorative panel as claimed in claim 1, wherein the overlay polymer and the base polymer are resin gelcoat polymers.

4. The decorative panel as claimed in claim 3, wherein the overlay polymer comprises styrene monomer and unsaturated polyester.

5. The decorative panel as claimed in claim 3, wherein the base polymer comprises unsaturated polyester.

6. The decorative panel as claimed in claim 1, wherein the overlay polymer and the base polymer are selected from the group consisting of: paint and urethane.

7. The decorative panel as claimed in claim 1, wherein the base polymer further comprises a catalyst compound.

8. The decorative panel as claimed in claim 7, wherein the catalyst compound comprises benzoyl peroxide.

9. The decorative panel as claimed in claim 1, wherein the relief element is indented towards the backing layer.

10. The decorative panel as claimed in claim 9, wherein the relief element is received in a recess defined in the front face of the backing layer configured to accommodate the relief element and a portion of the layer of the base polymer.

11. The decorative panel as claimed in claim 1, wherein the relief element projects away from the backing layer.

12. The decorative panel as claimed in claim 1, wherein the backing layer comprises a ridge defined in the front face, the ridge being configured to accommodate thereon the relief element and a portion of the layer of the base polymer sandwiched between the relief element and the backing layer.

13. The decorative panel as claimed in claim 1, wherein the relief element defines a grid pattern.

14. The decorative panel as claimed in claim 1, further comprising a barrier layer covering the relief decorative layer.

15. The decorative panel as claimed in claim 14, wherein the barrier layer is made of a transparent polymer.

16. The decorative panel as claimed in claim 1, wherein the decorative panel is one of a faux-tile panel and a faux-stone panel.

17. The decorative panel as claimed in claim 1, wherein the panel-receiving surface is one of a wall, a floor, and a ceiling.

18. The decorative panel as claimed in claim 17, wherein the panel-receiving surface is one of a wall of a bathroom and a floor of a bathroom.

19. A decorative panel comprising:
   a backing layer having a back face for abutting a panel-receiving surface and a front face opposite to the back face, the front face of the backing layer including a relief element;
   a layer of base polymer having a front face and a back face attached to the front face of the backing layer, the layer of base polymer covering the front face of the backing layer entirely, the layer of base polymer having a substantially constant thickness across the front face of the backing layer; and a layer of overlay polymer having a front face and a back face attached to the front face of the layer of base polymer, the layer of overlay polymer covering a first portion of the layer of base polymer, the first portion of the layer of base polymer corresponding to the relief element, wherein the layer of overlay polymer and the layer of base polymer are polymerized together to define an integral structure in the first portion of the layer of base polymer, and wherein the layer of base polymer further includes a second portion which is uncovered by the layer of overlay polymer, the front face of the layer of overlay polymer and the second portion of the layer of base polymer together defining relief structures.

* * * * *